(12) United States Patent
Kamo et al.

(10) Patent No.: US 11,283,119 B2
(45) Date of Patent: Mar. 22, 2022

(54) BATTERY DEVICE

(71) Applicant: TOYOTA JIDOSHA KABUSHIKI KAISHA, Toyota (JP)

(72) Inventors: Yoshiro Kamo, Kanagawa-ken (JP); Nobuyoshi Fujiwara, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 292 days.

(21) Appl. No.: 16/660,958

(22) Filed: Oct. 23, 2019

(65) Prior Publication Data
US 2020/0235445 A1    Jul. 23, 2020

(30) Foreign Application Priority Data

Jan. 23, 2019   (JP) .............................. JP2019-009237

(51) Int. Cl.
| | |
|---|---|
| *H01M 10/653* | (2014.01) |
| *B60H 1/00* | (2006.01) |
| *H01M 10/613* | (2014.01) |
| *H01M 10/625* | (2014.01) |
| *H01M 10/6552* | (2014.01) |
| *H01M 10/6569* | (2014.01) |

(52) U.S. Cl.
CPC ...... *H01M 10/653* (2015.04); *B60H 1/00278* (2013.01); *H01M 10/613* (2015.04); *H01M 10/625* (2015.04); *H01M 10/6552* (2015.04); *H01M 10/6569* (2015.04); *B60H 2001/00307* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2011/0200862 A1 | 8/2011 | Kurosawa | |
| 2014/0287288 A1* | 9/2014 | Takeda | ................ H01M 50/20 429/99 |
| 2014/0370340 A1* | 12/2014 | Kimura | ............ H01M 10/6561 429/72 |
| 2016/0204488 A1 | 7/2016 | Arai et al. | |
| 2017/0040652 A1* | 2/2017 | Tasai | ................ H01M 10/6554 |
| 2019/0198953 A1* | 6/2019 | Kramer | ............... H01M 10/643 |

FOREIGN PATENT DOCUMENTS

| | | |
|---|---|---|
| JP | 2000-095268 A | 4/2000 |
| JP | 2011-171029 A | 9/2011 |
| JP | 2011-246161 A | 12/2011 |
| JP | 2015-210894 A | 11/2015 |
| JP | 5942943 B2 | 6/2016 |

* cited by examiner

*Primary Examiner* — Christopher P Domone
(74) *Attorney, Agent, or Firm* — Sughrue Mion, PLLC

(57) ABSTRACT

A battery device includes a battery stack having battery cells, a first end member fixture, a second end member fixture, a temperature adjusting member for cooling the battery stack, and an external force applying device which applies a force to a specific battery cell of the battery cells via a first in-between part and/or a second in-between part. The first in-between part is a part located at a position closer to a center part between both ends of the first end member fixture than the both ends thereof. The second in-between part is a part located at a position closer to a center part between both ends of the second end member fixture than the both ends thereof. The force applied by the external force applying device is a force for causing the specific battery cell to move toward the temperature adjusting member.

4 Claims, 14 Drawing Sheets

BATTERY DEVICE

BACKGROUND OF THE INVENTION

1. Field of the Invention

The present invention relates to a battery device/apparatus for regulating a temperature of a battery and holding the battery.

2. Description of the Related Art

A battery device that can be mounted on a vehicle is disclosed in Japanese Patent Application Laid-Open No. 2015-210894. The battery device includes a cooler, a battery stack configured by arranging a plurality of battery cells in/along a predetermined straight/linear direction and disposed on a side of the cooler, and an annular restraining member (fixing member) contacting an outer peripheral surface of the cooler and the battery stack.

The planar shape of "the end surface of the battery stack" opposite to the cooler is substantially straight. Therefore, the restraining member has a flat plate-shaped holding part which contacts "the end surface of the battery stack" opposite to the cooler and extends straight in the longitudinal direction of the battery stack. Both ends of the holding part are supported at two parts of the restraining member. That is, the holding part is supported at the two parts.

The battery device may be provided with a heat transfer member having thermal conductivity and elasticity. The heat transfer member may be sandwiched between the side surface of the cooler and the surface of each battery cell on the cooler side. In this case, the force exerted by the restraining member applied to the outer peripheral surface of the cooler and the battery stack causes the surface of each battery cell on the cooler side to be pressed against the heat transfer member so that the heat transfer member is pressed against the cooler.

Therefore, when each battery cell generates heat when discharging and charging, the heat of each battery cell is absorbed by the cooler through the heat transfer member, so that each battery cell is prevented from becoming excessively high in temperature.

SUMMARY OF THE INVENTION

When each battery cell is pressed against the heat transfer member, the heat transfer member generates a reaction force that presses each battery cell in a direction away from the heat transfer member. Thus, the surface of each battery cell on the opposite side to the heat transfer member comes into pressure contact with the restraining part.

As a result, a center part of the holding part supported at both ends bends more greatly than the both ends thereof, and therefore, a distance between the cooler and the battery cell located at the center part in the longitudinal direction of the battery stack becomes slightly longer than a distance between the cooler and the battery cell located at each of the both ends. Consequently, the contact force between the heat transfer member and the battery cell located at the center part becomes smaller than the contact force between the heat transfer member and the battery cell located at each of the both ends, and this may cause the temperature of the battery cell located at the center part to be higher than the temperature of the battery cell located at each of the both ends.

SUMMARY OF THE INVENTION

The present invention has been made to solve the above-mentioned problems. That is, one of objects of the present invention is to provide a battery device capable of letting each battery cell contact with a heat transfer member having elasticity with a substantially uniform/same force, the heat transfer member being in contact with a temperature adjusting member.

The battery device according to the present invention comprises:

a battery stack (21A, 21B) including a plurality of battery cells (22) arranged along a predetermined straight direction;

a pair of end members (30, 30) spaced apart from each other in the straight direction to sandwich the battery stack in the straight direction;

a heat transfer member (60) having thermal conductivity and elasticity, which extends along the straight direction, and whose one of side surfaces contacts one of side surfaces of the battery stack;

a temperature adjusting member (70), extending along the straight direction and having on a side surface thereof a heat exchange part which contacts the other one of side surfaces of the heat transfer member, in which a fluid is flowing for performing heat exchange with the battery stack through the heat transfer member and the heat exchange part;

a first end member fixture (40, 45), facing the one of side surfaces of the battery stack, extending along the straight direction, and fixing a pair of the end members;

a second end member fixture (50, 55), facing the other one of the side surfaces of the battery stack, extending along the straight direction, and fixing a pair of the end members; and an external force applying device (100, 140, 150, 160, 165), which applies a force to a specific battery cell (22) of the battery cells via a first in-between part (40m, 45m) of the first end member fixture and/or a second in-between part (50m, 55m) of the second end member fixture, wherein the first in-between part is a part located at a position closer to a center part between both ends of the first end member fixture in the straight direction than the both ends of the first end member fixture, the second in-between part is a part located at a position closer to a center part between both ends of the second end member fixture in the straight direction than the both ends of the second end member fixture, the specific battery cell includes at least one of the battery cells and faces the first in-between part and the second in-between part, and the force is a force for causing the specific battery cell to move toward the temperature adjusting member.

In the battery device of the present invention, the external force applying device applies "the force for causing the specific battery cell to move toward the temperature adjusting member" to the specific battery cell via the first in-between part and/or the second in-between part. Therefore, it is harder for each of the in-between part of the first end member fixture and/or the in-between part of the second end member fixture to bend. Accordingly, it scarcely happens that the contact force of the specific battery cell to the heat transfer member becomes smaller than the contact force of the battery cell other than the specific battery cell to the heat transfer member. Consequently, each of the battery cells can be brought into contact with the heat transfer member with substantially the uniform/same magnitude of force.

In one of embodiments of the present invention, the external force applying device is a loop-like tightening member (100) which surrounds the battery stack and the temperature adjusting member and contacts an outside of the second in-between part to press the second in-between part against the other one of the side surfaces of the battery stack.

The embodiment described above can bring each of the battery cells into contact with the heat transfer member with substantially the uniform/same magnitude of force, using the external force applying device having the simple structure.

One of embodiments of the present invention (refer to FIG. 19) comprises:
two sets of the battery stack (21A, 21B);
two sets of the heat transfer member (60, 60);
two sets of the temperature adjusting member (70, 70); and
two sets of the second end member fixture (50, 55).

The two sets of the battery stack are separated from each other in a predetermined horizontal direction orthogonal to the straight direction. One of the two sets of the battery stack exchanges heat with one of the two sets of the temperature adjusting member through one of the two sets of the heat transfer member, and the other one of the two sets of the battery stacks exchanges heat with the other one of the two sets of the temperature adjusting member through the other one of the two sets of the heat transfer member.

The two sets of the second end member fixture face each other in the predetermined horizontal direction so as to form a gap therebetween, one of the two sets of the second end member fixture faces the other side surface of one of the two sets of the battery stack, and the other one of the two sets of the second end member fixture faces the other side surface of the other one of the two sets of the battery stack.

In this embodiment, the external force applying device includes wedge members (140, 150) which are positioned in the gap and contact two of the second in-between parts to press the two of the second in-between parts in such a manner that the two of the second in-between parts are further apart from each other in the horizontal direction.

The embodiment described above can also bring each of the battery cells into contact with the heat transfer member with substantially the uniform/same magnitude of force, using the external force applying device having the simple structure.

One of embodiments of the present invention (refer to FIG. 20) comprises:
two sets of the heat exchange part formed on both side surfaces of the temperature adjusting member;
two sets of the heat transfer member; and
two sets of the battery stack.

One of the two sets of the heat transfer member and one of the two sets of the battery stack are positioned/placed at one of both sides of the temperature adjusting member.

The other one of the two sets of the heat transfer member and the other one of the two sets of the battery stack are positioned/placed at the other one of the both sides of the temperature adjusting member.

In this embodiment, the external force applying device includes:
pressed parts (44, 49), each of which is provided at one of the two sets of the first end member fixture so as to be connected to the first in-between part (40m, 45m) of one of the two sets of the first end member fixture and has a through hole (44a, 49a), each of the two sets of the first end member fixture facing the one side surface of each of the two sets of the battery stack;
bolts (160), each of which goes through the through hole of the pressed parts; and
nuts (165), into which the bolts are screwed, to let the pressed parts come closer to each other.

The embodiment described above can also bring each of the battery cells into contact with the heat transfer member with substantially the uniform/same magnitude of force, using the external force applying device having the simple structure.

In the above description, references used in the following descriptions regarding embodiments are added with parentheses to the elements of the present invention, in order to assist in understanding the present invention. However, those references should not be used to limit the scope of the invention. Other objects, other features, and accompanying advantages of the present invention will be readily understood from the description of embodiments of the present invention to be given referring to the following drawings.

DETAILED DESCRIPTION OF THE EMBODIMENT

Figure 1:
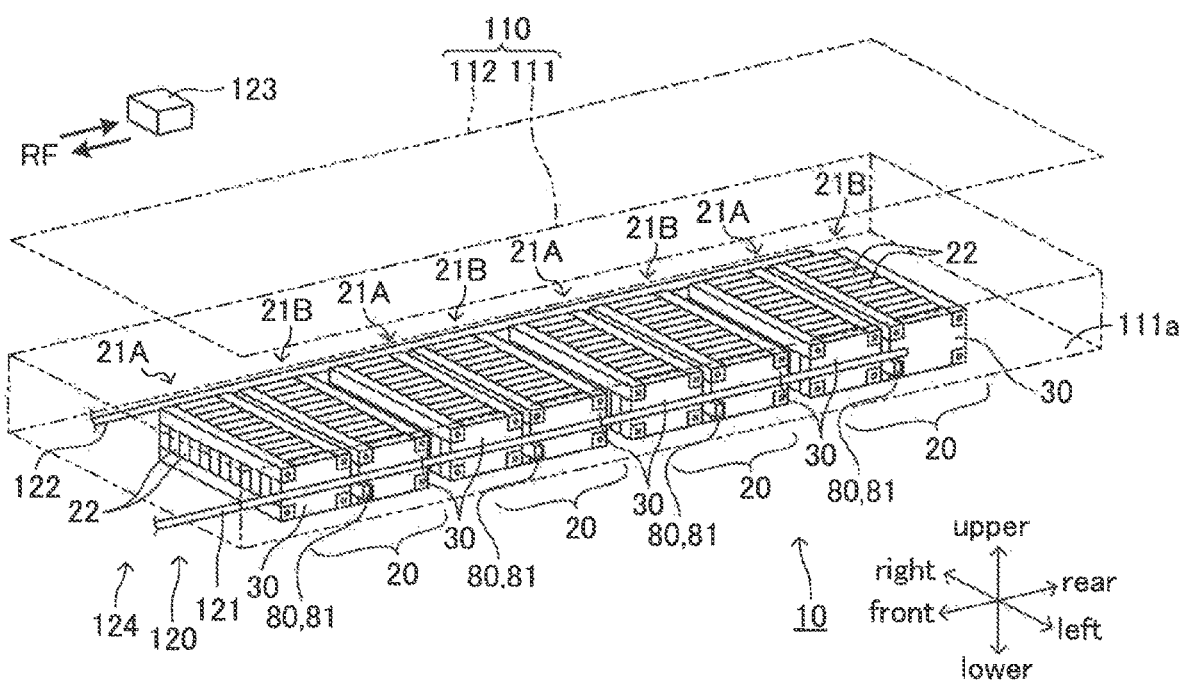
FIG. 1 is a perspective view of a battery device according to an embodiment of the present invention, wherein a cover, a lashing belt, a cushion member, and a fixing bracket are omitted.

Hereinafter, a battery device 10 according to an embodiment of the present invention will be described with reference to the accompanying drawings. The battery device 10 of the present embodiment is mounted on a vehicle such as an electric vehicle (EV) or a hybrid vehicle (HV or PHV). As shown in FIG. 1, the battery device 10 includes four battery modules 20 and a fluid circulation unit 120, as main components. Each of the battery modules 20 includes a first battery stack 21A and a second battery stack 21B. Each of the first battery stack 21A and the second battery stack 21B includes a plurality of battery cells 22 (and covers 23 which will be described later).

Figure 2:
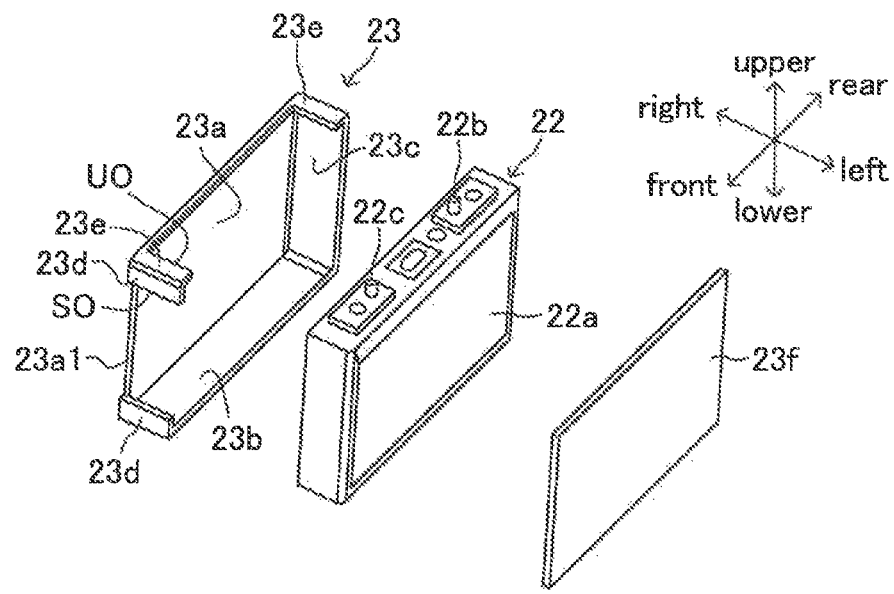
FIG. 2 is an exploded perspective view of the battery cell shown in FIG. 1 and a cover attached to the battery cell.

The battery cell 22 is a secondary battery. As shown in FIG. 2, the battery cell 22 includes a case 22*a*, a positive electrode terminal 22*b*, and a negative electrode terminal 22*c*. The case 22*a* is made of metal and has a substantially rectangular parallelepiped shape. The positive electrode terminal 22*b* and the negative electrode terminal 22*c* are provided on the upper surface of the case 22*a*.

Figure 3:
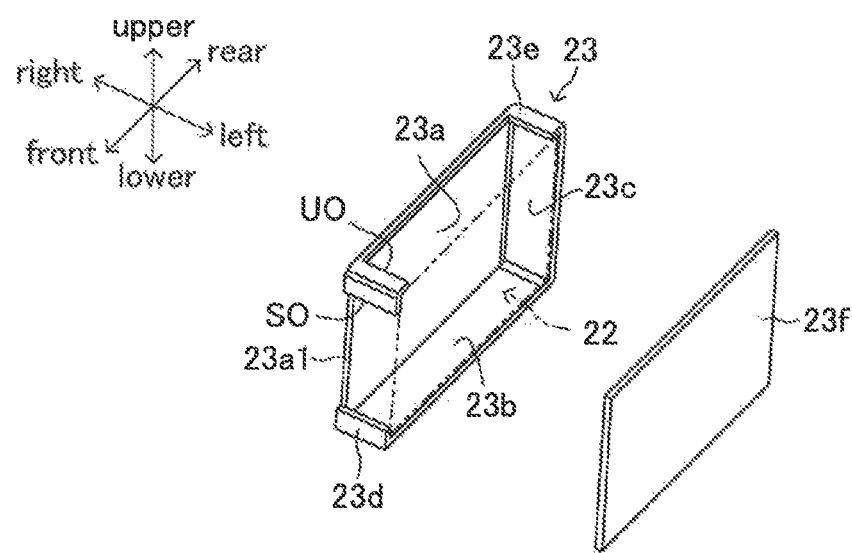
FIG. 3 is a perspective view of the battery cell and cover shown in FIG. 2.

As shown in FIGS. 2 and 3, the cover 23 is attached to each of the battery cells 22 included in the second battery stack 21B. The cover 23 is made of an insulating material (e.g., resin), and is substantially rectangular parallelepiped like the case 22*a* (battery cell 22).

The cover 23 includes a base part 23*a*, a bottom plate part 23*b*, an outer part 23*c*, an inner part 23*d*, a ceiling part 23*e*, and a lid plate 23*f*.

The base part 23*a* constitutes a right side wall of the cover 23. The bottom plate part 23*b* constitutes a bottom wall connected to the lower end of the base part 23*a*. The outer part 23*c* constitutes an outer wall extending upward from the rear end of the bottom plate part 23*b*. The inner part 23*d* constitutes an inner wall extending upward from the front end of the bottom plate part 23*b*. A sheet mounting opening SO is formed in a part of the inner part 23*d* so that only both upper and lower end parts of the inner part 23*d* are remaining. The ceiling part 23*e* constitutes an upper wall connected to the upper end of the base part 23*a*. The rear end part of the ceiling part 23*e* is connected to the upper end part of the outer part 23*c*, and the front end part of the ceiling part 23*e* is connected to the upper end part of the inner part 23*d*. An electrode exposure opening UO is formed in a part of the ceiling part 23*e* so that only both of the front and rear ends of the ceiling part 23*e* are remaining. The front end surface 23*a*1 of the base part 23*a* is positioned slightly rearward of (or with respect to) the inner part 23*d*.

When the cover 23 is attached to the battery cell 22, the right side surface of the case 22*a* contacts the left side surface of the base part 23*a*, and the bottom surface of the case 22*a* is covered by the bottom plate part 23*b*. The rear surface of the case 22*a* is covered by the outer part 23*c*, and both upper and lower end parts of the front surface of the case 22*a* are covered by the inner part 23*d*. The front and rear end parts of the upper surface of the case 22*a* are covered by the ceiling part 23*e*. The positive electrode terminal 22*b* and the negative electrode terminal 22*c* are exposed above the cover 23 through the electrode exposure opening UO. The lid plate 23*f* is attached to the opening of the left side surface of the cover 23. The lid plate 23*f* has the same shape as the opening of the left side surface of the cover 23, and is made of the same material as the cover 23. Therefore, the left side surface of the case 22*a* contacts the right surface of the lid plate 23*f*.

Although not shown, a cover having a shape symmetrical to that of the cover 23 shown in FIG. 2 is similarly attached to each of the battery cells 22 included in the first battery stack 21A.

Figure 4:
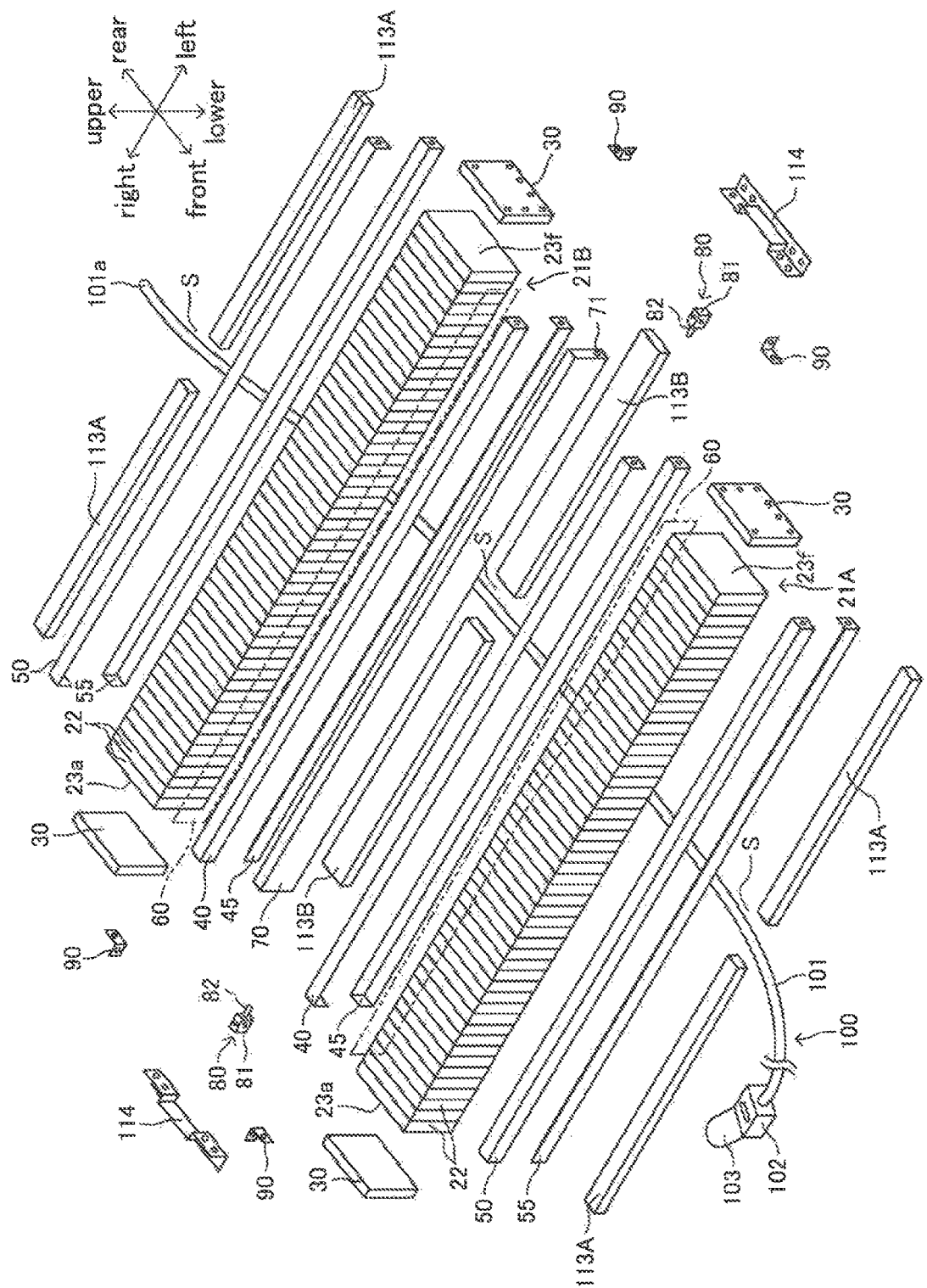
FIG. 4 is a schematic exploded perspective view of the battery module shown in FIG. 1, wherein the cover is omitted.

As shown in FIG. 4, each of the battery modules 20 includes, in addition to the first battery stack 21A and the second battery stack 21B, end members 30, first upper end member fixtures (referred to sometimes as first upper end fixtures or first upper fixing members) 40, first lower end member fixture (referred to sometimes as first lower end fixtures or first lower fixing members) 45, second upper end member fixtures (referred to sometimes as second upper end fixtures or second upper fixing member) 50, second lower end member fixtures (referred to sometimes as second lower end fixtures or second lower fixing members) 55, insulation heat transfer sheets 60, a temperature adjusting member 70, connection attachments 80, connecting brackets 90, and a lashing belt 100. Hereinafter, the first upper end member fixture 40, the first lower end member fixture 45, the second upper end member fixture 50, and the second lower end member fixture 55 may be referred to as the first upper fixture 40, the first lower fixture 45, the second upper fixture 50, and the second lower fixture 55, respectively. The first upper fixture 40, the first lower fixture 45, the second upper fixture 50, and the second lower fixture 55 are all made of metal. The plate thicknesses and left and right dimensions of the first upper fixture 40, the first lower fixture 45, the second upper fixture 50, and the second lower fixture 55 are the same as each other.

Each of the first battery stack 21A and the second battery stack 21B is a cell group configured by arranging a large number of battery cells 22 (battery cells 22 to which the covers 23 are attached) in a linear fashion in the left-right direction (i.e., battery cells 22 arranged along a predetermined straight direction). In FIG. 1, the number of the battery cells 22 constituting each of the first battery stack 21A and the second battery stack 21B is smaller than the number of the battery cells 22 shown in FIGS. 4 and 5, for illustration purpose. Furthermore, for simplification, the cover 23 is not shown in FIGS. 1, 4, and 5.

The first battery stack 21A is disposed so as to face a front surface (or front side surface, one of the side surfaces) of the temperature adjusting member 70. The second battery stack 21B is disposed so as to face a rear surface (or rear side surface, the other one of the side surfaces) of the temperature adjusting member 70.

The first battery stack 21A is disposed such that its front surface faces the front "second upper fixture 50 and second lower fixture 55" and its rear surface faces the front "first upper fixture 40 and first lower fixture 45".

The second battery stack 21B is disposed such that its front surface faces the rear "first upper fixture 40 and first lower fixture 45" and its rear surface faces the rear "second upper fixture 50 and second lower fixture 55".

The positive electrode terminals 22*b* of the battery cells 22 constituting the first battery stack 21A are connected to each other by an unillustrated bus bar. The negative electrode terminals 22*c* of the battery cells 22 constituting the first battery stack 21A are connected to each other by an unillustrated bus bar. Similarly, the positive electrode terminals 22*b* of the battery cells 22 constituting the second battery stack 21B are connected to each other by an unillustrated bus bar. The negative electrode terminals 22*c* of the battery cells 22 constituting the second battery stack 21B are connected to each other by an unillustrated bus bar. The first battery stack 21A and the second battery stack 21B are connected to an unillustrated charger and an unillustrated electric load (e.g., an inverter) mounted on the vehicle via an unillustrated switching circuit. When an external power source is connected to the charger, and the first battery stack 21A and the second battery stack 21B are connected to the charger, each battery cell 22 of the first battery stack 21A and the second battery stack 21B is charged. When the first battery stack 21A and the second battery stack 21B are connected to the electric load, each battery cell 22 of the first battery stack 21A and the second battery stack 21B is discharged.

Figure 6:
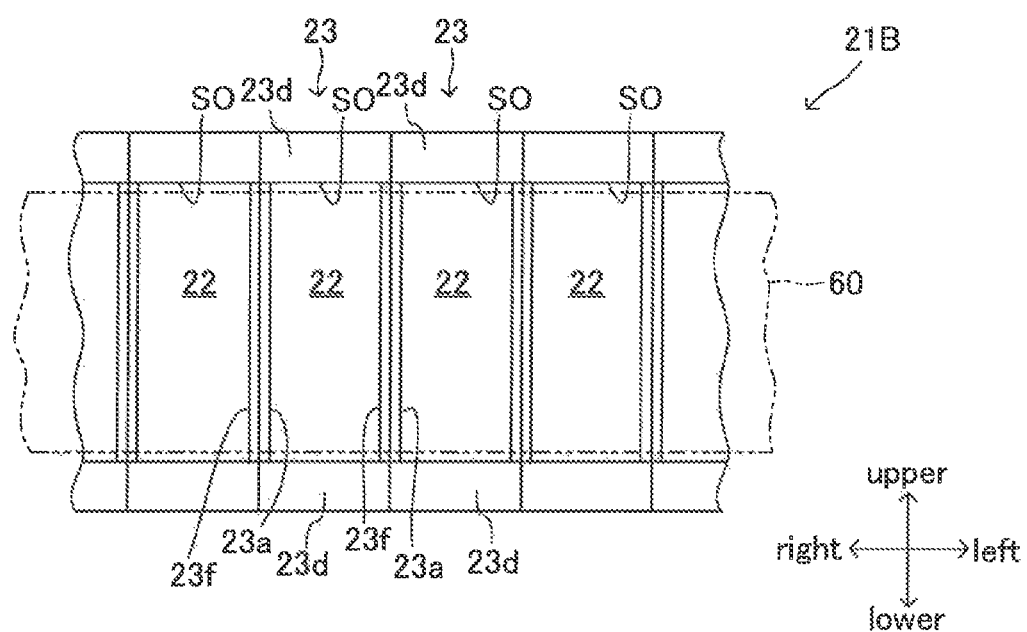
FIG. 6 is a front view of the battery stack and insulating heat transfer sheet shown in FIG. 4.

As shown in FIG. 6, in the second battery stack 21B, the right side of the base part 23a of the certain cover 23 is in contact with the left side surface of the lid plate 23f of the cover 23 adjacent to that certain cover 23. The sheet mounting openings SO of the adjacent covers 23 are continuous with each other in the left-right direction. The same applies to the first stack 21A. That is, in the first battery stack 21A, the sheet mounting openings SO of the adjacent covers are continuous with each other in the left-right direction.

As shown in FIG. 4, the battery module 20 includes four of the end members 30. More specifically, each of the first battery stack 21A and the second battery stack 21B is located between a pair of the end members 30.

Figure 7:
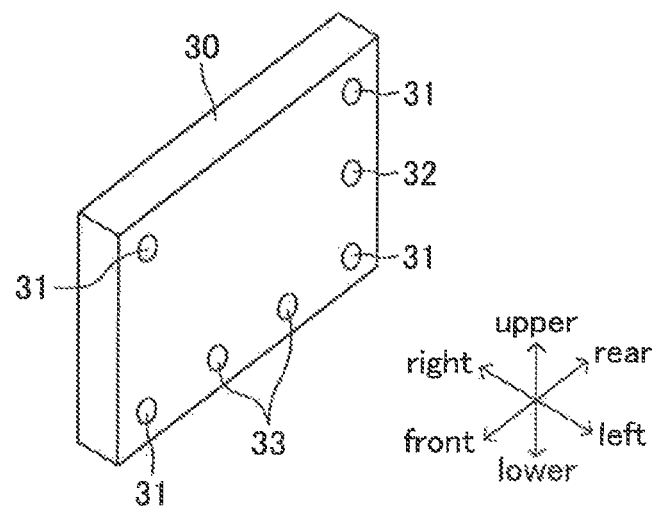
FIG. 7 is an enlarged perspective view of the end member shown in FIG. 4.

The end member 30 is made of metal, and has a rectangular parallelepiped, as shown in FIG. 7. The front-rear dimension, the vertical dimension, and the left-right dimension (thickness) of the end member 30 are substantially the same as those of the case 23, respectively. The end member 30 is a solid member, and the rigidity of the end member 30 with respect to the external force in the thickness direction is higher than that of the case 22a. Note, however, that the left-right dimension of the end member 30 may be different from that of the case 22a. Furthermore, the end member 30 may be a hollow member.

As shown in FIGS. 4 and 7, four female screw holes 31 are formed at the four corners of the left side surface of the end member 30 which is located on the left side of the first battery stack 21A. A female screw hole 32 is formed between the two female screw holes 31 on the rear side, and two female screw holes 33 are formed between the two female screw holes 31 on the lower side. On the left side surface of the end member 30 which is located on the left side of the second battery stack 21B, four female screw holes 31, one female screw hole 32, and two female screw holes 33 are formed so as to be symmetrical with the end member 30 which is located on the left side of the first battery stack 21A (with respect to the left-right direction). Although not shown, four female screw holes 31, one female screw hole 32, and two female screw holes 33 are formed on the right side surface of the right end member 30 of the first battery stack 21A so as to be symmetrical with the left end member 30 of the first battery stack 21A (with respect to the front-rear direction). Similarly, on the right side surface of the end member 30 on the right side of the second battery stack 21B, four female screw holes 31, one female screw hole 32, and two female screw holes 33 are formed so as to be symmetrical with the end member 30 on the left side of the second battery stack 21B (with respect to the left-right direction).

Figure 5:
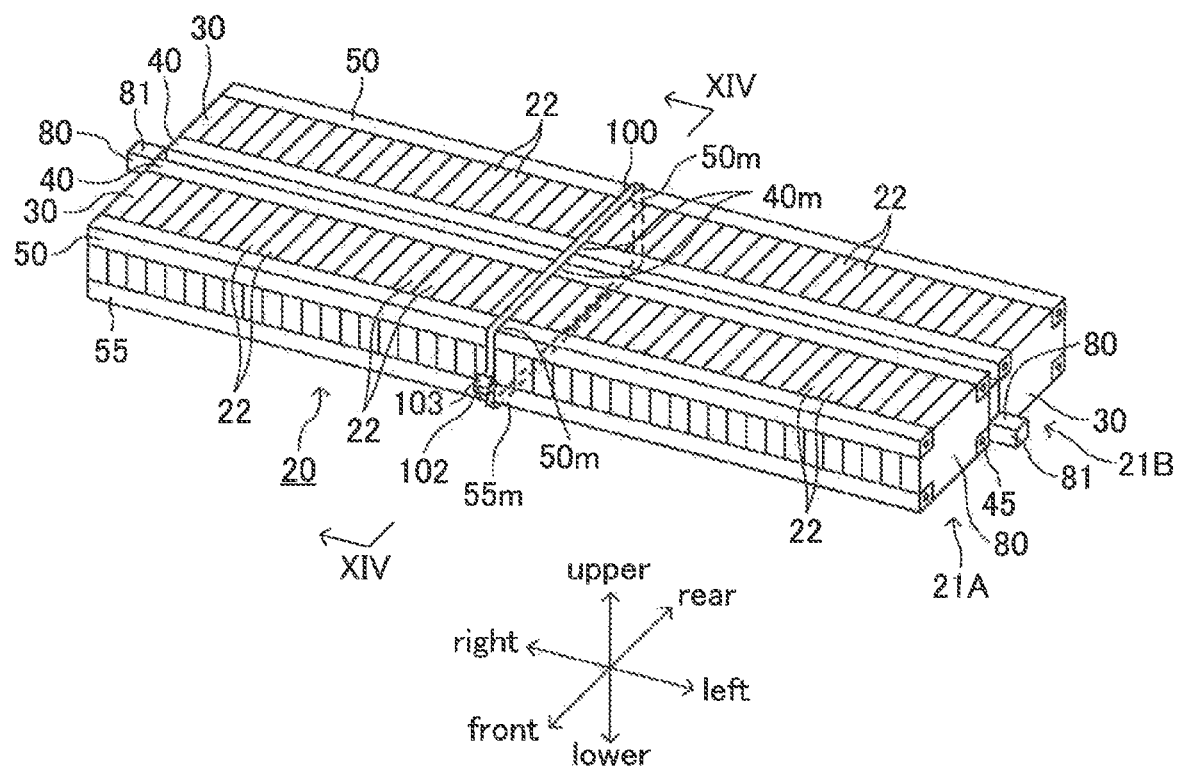
FIG. 5 is a schematic perspective view of the battery module shown in FIG. 1.
Figure 8:
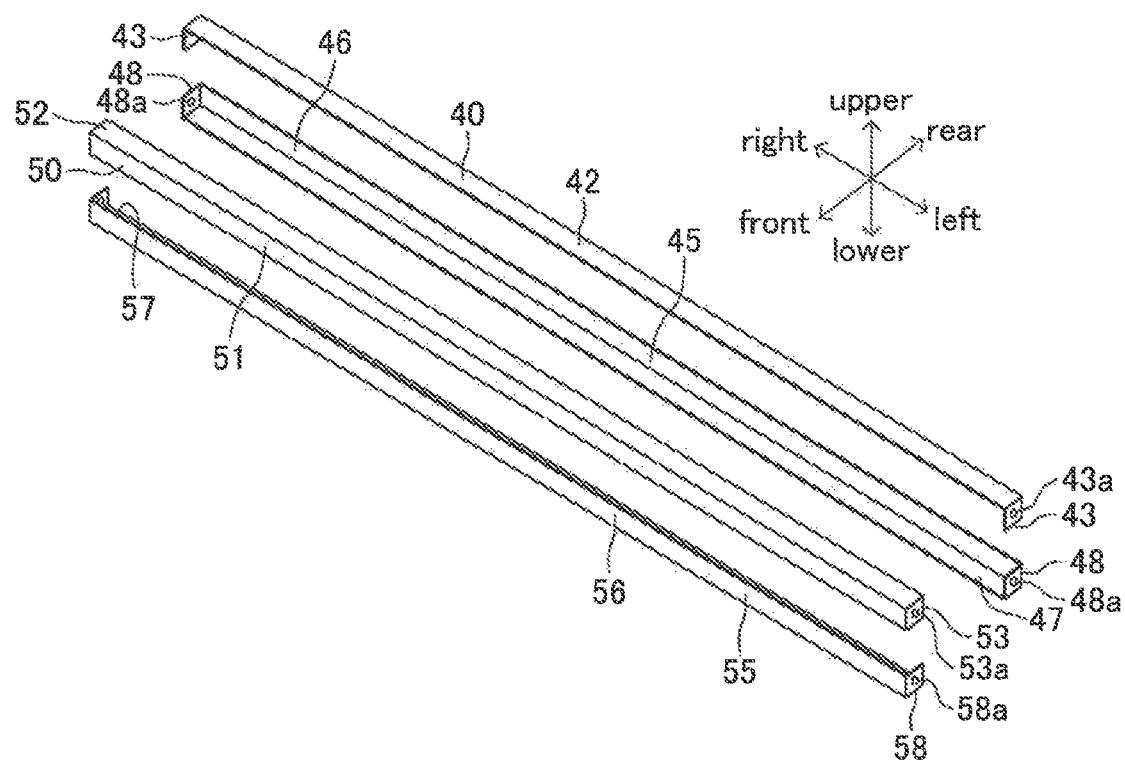
FIG. 8 is an enlarged perspective view of the first upper fixture, the first lower fixture, the second upper fixture, and the second lower fixture, all shown in FIG. 4.
Figure 9:
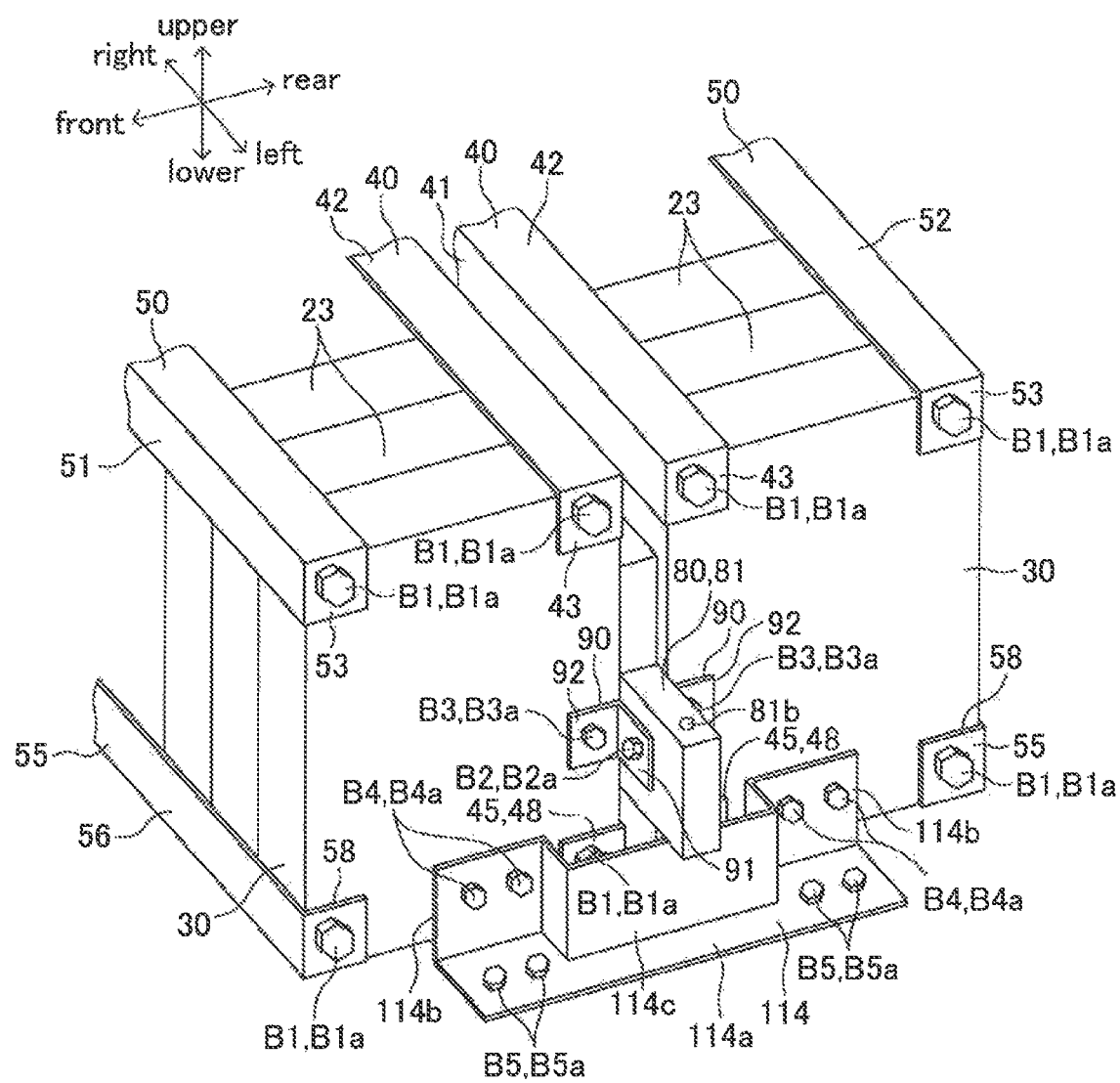
FIG. 9 is a perspective view of one end of the battery module according to the embodiment of the present invention.

As shown in FIGS. 4 and 5, the first upper fixture 40 on the front side (i.e., the front first upper fixture 40) is attached to the first battery stack 21A, and the first upper fixture 40 on the rear side (i.e., the rear first upper fixture 40) is attached to the second battery stack 21B. The front first upper fixture 40 and the rear first upper fixture 40 are symmetrical with each other in the front-rear direction (i.e., with respect to the left-right direction). As shown in FIGS. 8 and 9, the first upper fixture 40 has a side surface part 41, a ceiling part 42, and a pair of end surface parts 43. The side surface part 41 (refer to FIG. 9) is a flat plate part orthogonal to the front-rear direction. The ceiling part 42 is a flat plate part which is connected to the upper edge part of the side surface part 41 and which is orthogonal to the vertical direction. Each of the end surface parts 43 is a flat plate part orthogonal to the left and right direction. The end surface part 43 on the left side is connected to the left end parts of the side surface part 41 and the ceiling part 42. The end surface part 43 on the right side is connected to the right end parts of the side surface part 41 and the ceiling part 42. A through hole 43a is formed in each of the left and right side end surface parts 43.

As shown in FIGS. 4 and 5, the first lower fixture 45 on the front side (i.e., the front first lower fixture 45) is attached to the first battery stack 21A, and the first lower fixture 45 on the rear side (i.e., the rear first lower fixture 45) is attached to the second battery stack 21B. The front first lower fixture 45 and the rear first lower fixture 45 are symmetrical with each other in the front-rear direction (i.e., with respect to the left-right direction). The front first lower fixture 45 is symmetrical with the front first upper fixture 40 in the vertical direction. The rear first lower fixture 45 is symmetrical with the rear first upper fixture 40 in the vertical direction. As shown in FIG. 8, the front first lower fixture 45 has a side surface part 46, a bottom plate part 47, and a pair of end surface parts 48. The side surface part 46 is a flat plate part orthogonal to the front-rear direction. The bottom plate part 47 is a flat plate part which is connected to the lower edge parts of the side surface part 46 and which is orthogonal to the vertical direction. Each of the end surface parts 48 is a flat plate part orthogonal to the left and right direction. The end surface part 48 on the left side is connected to the left end parts of the side surface part 46 and the bottom plate part 47. The end surface part 48 on the right side is connected to the right end parts of the side surface part 46 and the bottom plate part 47. A through hole 48a is formed in each of the left and right side end surface parts 48.

As shown in FIGS. 4 and 5, the second upper fixture 50 on the front side (i.e., the front second upper fixture 50) is attached to the first battery stack 21A, and the second upper fixture 50 on the rear side (i.e., the rear second upper fixture 50) is attached to the second battery stack 21B. The front first second upper fixture 50 and the rear first second upper fixture 50 are symmetrical with each other in the front-rear direction (with respect to the left-right direction). The front second upper fixture 50 is symmetrical with the front first upper fixture 40 in the front-rear direction (i.e., with respect to the left-right direction). The rear second upper fixture 50 is symmetrical with the rear first upper fixture 40 in the front-rear direction (with respect to the left-right direction). As shown in FIG. 8, the second upper fixture 50 has a side surface part 51, a ceiling part 52, and a pair of end surface parts 53. The side surface part 51 is a flat plate part orthogonal to the front-rear direction. The ceiling part 52 is a flat plate part which is connected to the upper edge part of the side surface part 51 and which is orthogonal to the vertical direction. Each of the end surface parts 53 is a flat plate part orthogonal to the left and right direction. The end surface part 53 on the left side is connected to the left end parts of the side surface part 51 and the ceiling part 52. The end surface part 53 on the right side is connected to the right end parts of the side surface part 51 and the ceiling part 52. A through hole 53a is formed in each of the left and right side end surface parts 53.

As shown in FIGS. 4 and 5, the second lower fixture 55 of the front side (i.e., the front second lower fixture 55) is attached to the first battery stack 21A, and the second lower fixture 55 of the rear side (i.e., the rear second lower fixture 55) is attached to the second battery stack 21B. The front second lower fixture 55 and the rear second lower fixture 55 are symmetrical with each other in the front-rear direction.

The front second lower fixture 55 is symmetrical with the front first lower fixture 45 in the front-rear direction (with respect to the left-right direction). The rear second lower fixture 55 is symmetrical with the rear first lower fixture 45 in the front-rear direction (with respect to the left-right direction). As shown in FIG. 8, the second lower fixture 55 has a side surface part 56, a bottom plate part 57, and a pair of end surface parts 58. The side surface part 56 is a flat plate part orthogonal to the front-rear direction. The bottom plate part 57 is a flat plate part which is connected to the lower edge part of the side surface part 56 and which is orthogonal to the vertical direction. Each of the end surface parts 58 is a flat plate part orthogonal to the left and right direction. The end surface part 58 on the left side is connected to the left end parts of the side surface part 56 and the bottom plate part 57. The end surface part 58 on the right side is connected to the right end parts of the side surface part 56 and the bottom plate part 57. A through hole 58a is formed in each of the left and right side end surface parts 58.

As shown in FIG. 4, one of the end members (the left end member) 30 is brought into contact with the left side surface of the lid plate 23f attached to the battery cell 22 at the left end of the first battery stack 21A, and the other one of the end members (the right end member) 30 is brought into contact with the right side surface of the cover 23 (i.e., base part 23a) attached to the battery cell 22 at the right end of the first battery stack 21A.

The front first upper fixture 40 is disposed such that "the first battery stack 21A and the left and right end members 30" are positioned between the left and right end surface parts 43 thereof, and the first upper fixture 40 opposes/faces the upper corner parts of the rear end parts of "the first battery stack 21A and the left and right end members 30".

The front first lower fixture 45 is disposed such that "the first battery stack 21A and the left and right end members 30" are positioned between the left and right end surface parts 48 thereof, and the front first lower fixture 45 opposes/faces the lower corner parts of the rear end parts of "the first battery stack 21A and the left and right end members 30".

The front second upper fixture 50 is disposed such that "the first battery stack 21A and the left and right end members 30" are positioned between the left and right end surface parts 53 thereof, and the front second upper fixture 50 opposes/faces the upper corner parts of the front end parts of "the first battery stack 21A and the left and right end members 30".

The front second lower fixture 55 is disposed such that "the first battery stack 21A and the left and right end members 30" are positioned between the left and right end surface parts 58 thereof, and the front second lower fixture 55 opposes/faces the lower corner parts of the front end parts of "the first battery stack 21A and the left and right end members 30".

The left end surface parts 43, 48, 53, and 58 are brought into contact with the left side surface of the left end member 30, and the right end surface parts 43, 48, 53, and 58 are brought into contact with the right side surface of the right end member 30. As a result, the first battery stack 21A is sandwiched in the left-right direction by the left and right end members 30. Note that, in order to bring the end surface parts 43, 48, 53, and 58 into contact with the left and right end members 30, for example, a spacer (not shown) may be inserted between the right end member 30 and the adjacent cover 23 or between the adjacent covers 23, if necessary.

Further, the bolt B1 inserted into each of the through-hole 43a of the left end surface part 43, the through-hole 48a of the left end surface part 48, the through-hole 53a of the left end surface part 53, and the through-hole 58a of the left end surface part 58 is screwed into the respective female screw hole 31 of the left end member 30, and the head part B1a of each bolt B1 is pressed against the end surface parts 43, 48, 53, 58 thereof (see FIG. 9). Similarly, although not shown, the bolt B1 inserted into each of the right through holes 43a, 48a, 53a, and 58a is screwed into the respective female screw hole 31 of the right end member 30, and the head part B1a of each bolt B1 is pressed against the end surface parts 43, 48, 53, and 58 thereof. As a result, the left and right end members 30 are fixed to each other by the first upper fixture 40, the first lower fixture 45, the second upper fixture 50, and the second lower fixture 55, and the contact state between the cover 23 and the lid plate 23f adjacent to each other in the first battery stack 21A is secured/maintained.

Similarly, as can be understood from FIGS. 5 and 9, the rear "first upper fixture 40, first lower fixture 45, second upper fixture 50, and second lower fixture 55" are disposed so as to face the four corners of the "second battery stack 21B and a pair of the end members 30 located on the left and right sides thereof". The rear "first upper fixture 40, first lower fixture 45, second upper fixture 50, and second lower fixture 55" are fixed to the left and right end members 30 with eight bolts B1. As a result, the contact state between the cover 23 and the lid plate 23f adjacent to each other in the second battery stack 21B is also secured/maintained.

Accordingly, the lower surface of the ceiling part 42 of each first upper fixture 40 contacts the upper surface of the each "cover 23 and end member 30", and the upper surface of the bottom plate part 47 of each first lower fixture 45 contacts the lower surface of the each "cover 23 and end member 30". The side surface part 41 of each of the first upper fixtures 40 and the side surface part 46 of each of the first lower fixtures 45 are slightly separated from the side surfaces of "the covers 23 and the end members 30". The lower surface of the ceiling part 52 of each second upper fixture 50 contacts the upper surface of the each "cover 23 and end member 30", and the upper surface of the bottom plate part 57 of each second lower fixture 55 contacts the lower surface of the each "cover 23 and end member 30". The side surface 51 of the each second upper fixture 50 and the side surface 56 of the each second lower fixture 55 contact the side surface of each of "the covers 23 and the end members 30".

The battery device 10 includes a pair of the insulation heat transfer sheets 60 shown in FIG. 4. The insulation heat transfer sheet 60 is made of an elastic material having insulating properties and high thermal conductivity. The insulation heat transfer sheet 60 is an elongated member (belt-like sheet) extending in the left-right direction. The left-right dimension (length) of the insulation heat transfer sheet 60 is substantially the same as each of the length of the first battery stack 21A in the left-right direction and the length of the second battery stack 21B in the left-right direction. As shown in FIG. 6, the vertical dimension (width) of the insulation heat transfer sheet 60 is slightly smaller than the vertical dimension of the sheet mounting opening SO. Further, the front-rear dimension (thickness) of the insulation heat transfer sheet 60 is larger than the plate thickness (thickness of the inner part 23d) of the part constituting the sheet mounting opening SO.

As shown in FIG. 6, the insulation heat transfer sheet 60 is disposed along an opening formed by the sheet mounting openings SO in each of the first battery stack 21A and the second battery stack 21B. When disposed, a part of the insulation heat transfer sheet 60 (a part on the side facing the temperature adjusting member 70) is located outside (protrude from) the cover 23 with respect to the opening SO.

Accordingly, the front surface of the insulation heat transfer sheet 60 on the front side (i.e., the sheet 60 mounted on the first battery stack 21A, or the front insulation heat transfer sheet 60) contacts the rear surface of each of the battery cells 22 of the first battery stack 21A. The rear surface of the front insulation heat transfer sheet 60 is located on the rear side of each of the covers 23 of the first battery stack 21A (refer to FIGS. 13 and 14).

Similarly, the front surface of the insulation heat transfer sheet 60 on the rear side (i.e., the sheet 60 mounted on the second battery stack 21B, or the rear insulation heat transfer sheet 60) is located on the front side of each of the covers 23 of the second battery stack 21B. The rear surface of the rear insulation heat transfer sheet 60 contacts the front surface of each of the battery cells 22 of the second battery stack 21B (see FIGS. 13 and 14).

Figure 14:
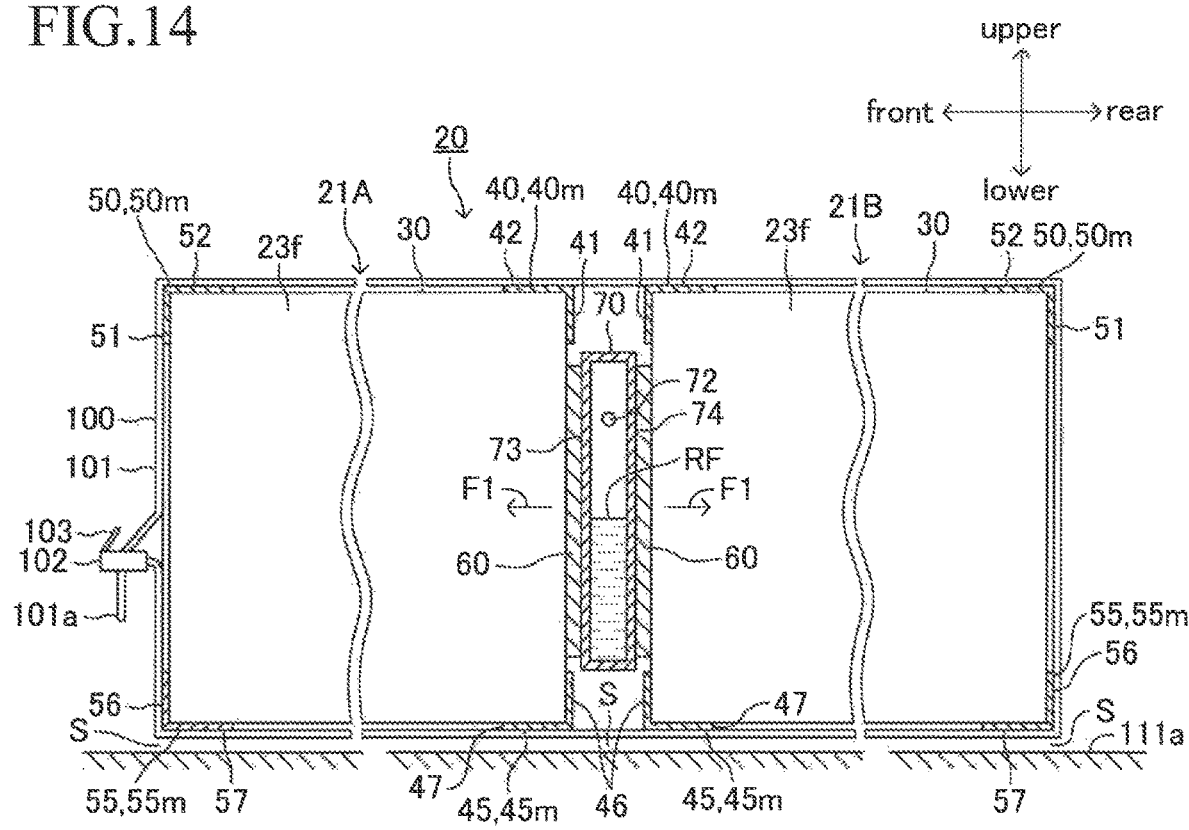
FIG. 14 is a schematic cross-sectional view taken along the XIV-XIV line of FIG. 5.

The temperature adjusting member 70 shown in FIG. 4 is made of metal and an integrally molded member. The temperature adjusting member 70 is positioned between the first battery stack 21A (the front insulation heat transfer sheet 60) and the second battery stack 21B (the rear insulation heat transfer sheet 60). The temperature adjusting member 70 has a substantially rectangular parallelepiped shape and extends in the left-right direction. The left-right dimension (horizontal length) of the temperature adjusting member 70 is larger than that of the first battery stack 21A and that of the second battery stack 21B. As shown in FIG. 14, the temperature adjusting member 70 is hollow. Further, as shown in FIG. 4, a first connection hole 71 is formed in the left end surface of the temperature adjusting member 70. The position of the first connection hole 71 is below the center part in the vertical direction of the left end surface of the temperature adjusting member 70. As shown in FIG. 14, a second connection hole 72 is formed in the right end surface of the temperature adjusting member 70. The position of the second connection hole 72 is above the center part in the vertical direction of the right end surface of the temperature adjusting member 70. The entire front surface of the temperature adjusting member 70 is/constitutes the heat exchange part 73, and the entire rear surface of the temperature adjusting member 70 is/constitutes the heat exchange part 74.

Figure 13:
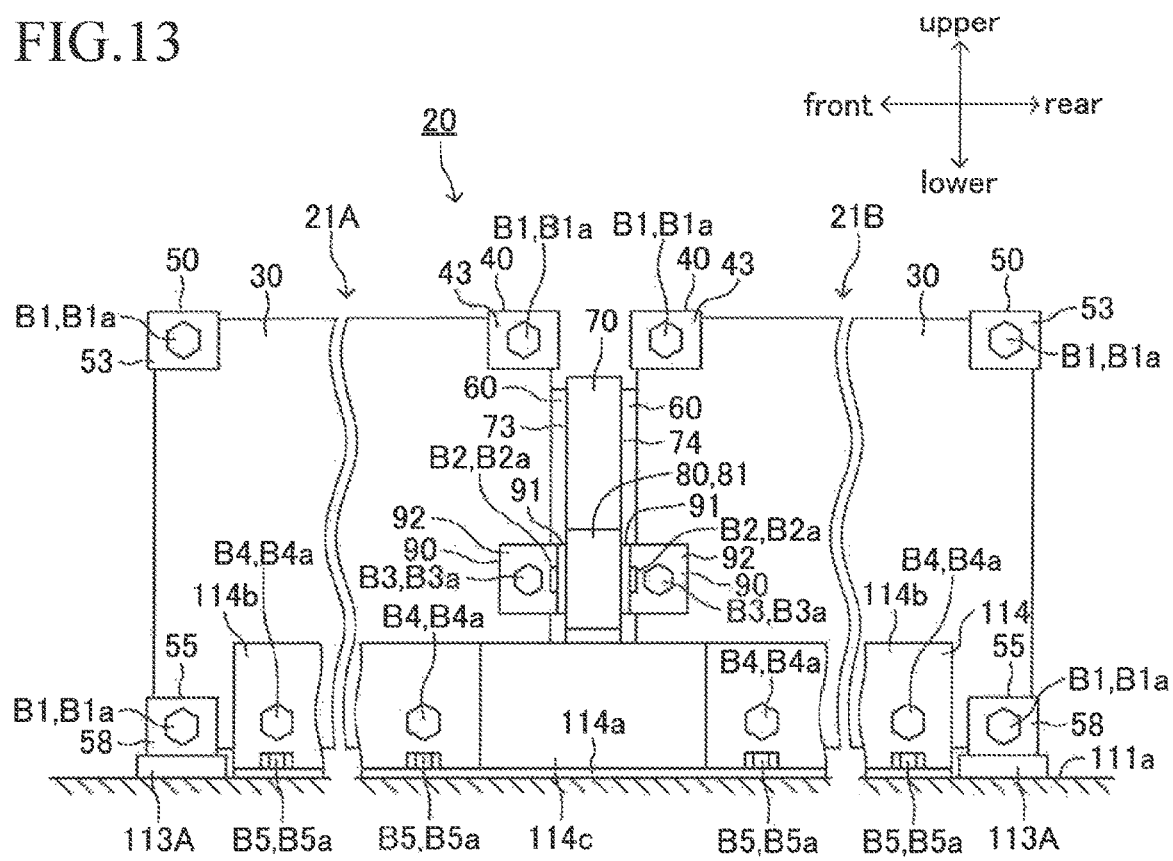
FIG. 13 is a side view of the bottom plate part of the case body, the battery modules, cushion members, and the fixing brackets, according to the embodiment of the present invention.

As shown in FIGS. 5, 9, and 13, an integrated body including the first battery stack 21A, the (front) first upper fixture 40, the (front) first lower fixture 45, the (front) second upper fixture 50, the (front) second lower fixture 55, and the end members 30 is positioned on the front side of the temperature adjusting member 70, and the front insulation heat transfer sheet 60 is brought into contact with the rear surface of the first battery stack 21A and the heat exchange part 73. Similarly, an integrated body including the second battery stack 21B, the (rear) first upper fixture 40, the (rear) first lower fixture 45, the (rear) second upper fixture 50, the (rear) second lower fixture 55, and the end members 30 is positioned on the rear side of the temperature adjusting member 70, and the rear insulation heat transfer sheet 60 is brought into contact with the front surface of the second battery stack 21B and the heat exchange part 74.

Furthermore, "two of the connection attachments 80 and four of the connecting brackets 90" shown in FIG. 4 are used to fix the temperature adjusting member 70 and the end members 30 to each other (see FIG. 9).

Figure 10:
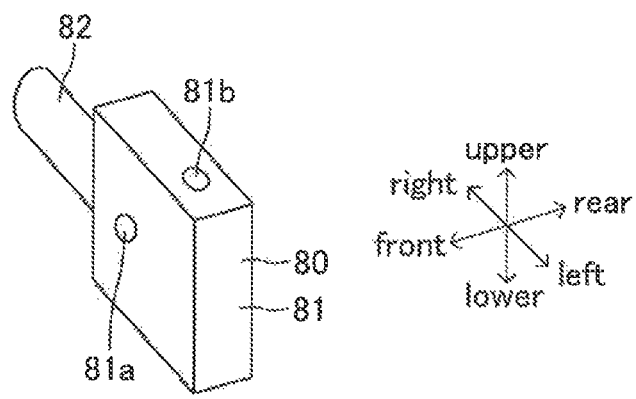
FIG. 10 is an enlarged perspective view of the connection attachment shown in FIG. 4.

The connection attachment 80 is made of metal. As shown in FIG. 10, the connection attachment 80 includes a tube connection part 81 having a rectangular parallelepiped shape, and a connection protrusion (projected part) 82 protruding from the tube connection part 81. In the connection attachment 80, an unillustrated fluid through hole that penetrates the tube connection part 81 and the connection protrusion part 82 is formed. A female screw hole 81a which is a bottomed hole is formed on each of a front surface and a rear surface of the tube connecting part 81 (only the female screw hole 81a on the front side is shown in FIG. 10). A tube connecting hole 81b which is a through hole is formed on the upper surface of the tube connecting part 81. The through hole communicates with the unillustrated fluid through hole.

Figure 11:
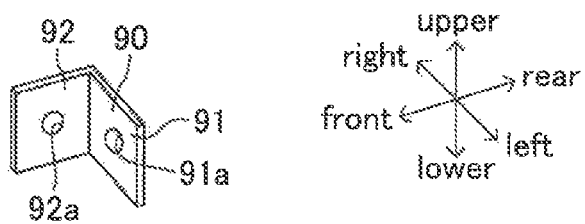
FIG. 11 is an enlarged perspective view of the connecting bracket shown in FIG. 4.

The connecting bracket 90 is made of metal. As shown in FIG. 11, the connecting bracket 90 includes a first coupling piece 91 and a second coupling piece 92 connected to the first coupling piece 91. The cross-sectional shape of the connecting bracket 90 is L-shaped. A bolt insertion hole 91a is formed in the first coupling piece 91, and a bolt insertion hole 92a is formed in the second coupling piece 92.

As shown in FIGS. 5 and 9, the connection attachment 80 on the left side (i.e., the left connection attachment 80) is connected to the temperature adjustment member 70 by fitting the connection protrusion 82 into the first connection hole 71 of the temperature adjustment member 70. When the left connection attachment 80 is connected to the temperature adjustment member 70, the female screw hole 81a and the tube connection hole 81b of the left connection attachment 80 are located on the left side of the left end member 30. Similarly, by fitting the connection protrusion 82 of the connection attachment 80 on the right side (i.e., the right connection attachment 80) into the second connection hole 72, the right connection attachment 80 is connected to the temperature adjusting member 70, as shown in FIG. 5. When the right connection attachment 80 is connected to the temperature adjustment member 70, the female screw hole 81a and the tube connection hole 81b of the right connection attachment 80 are located on the right side of the right end member 30.

As shown in FIG. 9, two of the connecting brackets 90 are disposed on both of the front and rear sides of the tube connecting part 81 of the left connecting attachment 80, respectively. At this time, the first coupling piece 91 of one of the connecting brackets 90 is brought into contact with the front surface of the tube connecting part 81, and first coupling piece 91 of the other of the connecting brackets 90 is brought into contact with the rear surface of the tube connecting part 81. Further, the second connecting pieces 92 are brought into contact with the left side surfaces of the front and rear end members 30. The bolt B2 inserted into each of the bolt insertion hole 91a is screwed into the female screw hole 81a, and the head B2a of the bolt B2 is pressed against the first connecting piece 91. The bolt B3 inserted into the bolt insertion hole 92a is screwed into the female screw hole 32 of the end member 30, and the head B3a of the bolt B3 is pressed against the second coupling piece 92. As a result, the left end part of the temperature adjusting member 70 and the front and rear end members 30 are fixed to each other via the left connecting attachment 80 and the front and rear connecting brackets 90.

Similarly, two of the connecting brackets 90 are disposed on both of the front and rear sides of the tube connecting part 81 of the right connecting attachment 80, respectively. The two of the connecting brackets 90 are fixed to the right connection attachment 80 and the right end members 30 with the bolts B2 and B3. As a result, the right end part of the temperature adjusting member 70 and the front and rear end members 30 are fixed to each other via the right connection attachment 80 and the front and rear connecting brackets 90.

By utilizing the two of the connection attachments 80 and the four of the connecting brackets 90 in the above manner, the first battery stack 21A, the second battery stack 21B, the four of the end members 30, a pair of the first upper fixtures 40, a pair of the first lower fixtures 45, a pair of the second upper fixtures 50, a pair of the second lower fixtures 55, a pair of the insulation heat transfer sheets 60, and the temperature adjusting member 70 are integrated/united. Hereinafter, a part having the thus integrated parts is referred to as an "integrated object" for convenience. In the integrated object, a contact state between the front insulation heat transfer sheet 60 and the heat exchange part 73 of the temperature adjusting member 70 is secured/maintained, and a contact state between the rear insulation heat transfer sheet 60 and the heat exchange part 74 of the temperature adjusting member 70 is secured/maintained.

The lashing belt 100 shown in FIGS. 4, 5 and 14 includes a belt 101, a ratchet buckle 102 fixed to one end of the belt 101, and a release lever 103 rotatably connected to the ratchet buckle 102. The belt 101 is made of polyparaphenylene terephthalamide and has flexibility. The width of the belt 101 is substantially the same as the left and right dimensions of the battery cell 22 (cover 23). The ratchet buckle 102 includes an unillustrated ratchet mechanism. The release lever 103 is rotatable relative to the ratchet buckle 102 between an initial position shown in FIGS. 5 and 14 and a release position shown in FIG. 4. It should be noted that device having functions equivalent to those of the ratchet buckle 102 and the release lever 103 are well known as disclosed in, for example, Japanese Patent Laid-Open No. 2000-095268 and Japanese Patent Laid-Open No. 2011-246161.

As shown in FIGS. 5 and 14, the belt 101 is wound around the center in the left-right direction of the integrated object (21A, 21B, 30, 40, 45, 50, 55, 60, 70, 80, and 90). That is, the belt 101 contacts the outer surface of the center part 40$m$ in the left-right direction of each of the first upper fixtures 40 (center part may be referred to as in-between part), the outer surface of the center part 45$m$ in the left-right direction of each of the first lower fixtures 45, the outer surface of the center part 50$m$ in the left-right direction of each of the second upper fixtures 50, and the outer surface of the center part 55$m$ in the left-right direction of each of the second lower fixtures 55. The belt 101 is not in contact with the followings: the first battery stack 21A; the second battery stack 21B; the end members 30; the insulation heat transfer sheets 60; and the temperature adjusting member 70. The left and right dimensions of the center parts 40$m$, 45$m$, 50$m$, and 55$m$ are substantially the same as the left and right dimensions of the battery cell 22 (i.e., the cover 23).

As shown in FIG. 14, when the release lever 103 is positioned at the initial position with an end 101$a$ of the belt 101 opposite to the ratchet buckle 102 passing through the ratchet buckle 102, the relative position between the belt 101 and the ratchet buckle 102 is fixed by the action of the ratchet buckle 102. Therefore, when an amount of protrusion of the end part 101$a$ from the ratchet buckle 102 is set to a predetermined amount or more and the release lever 103 is positioned at the initial position, a part of the belt 101 except the end part 101$a$ comes into strong contact with the side surface part 51 of each of the second upper fixtures 50 and the side surface part 56 of each of the second lower fixtures 55 while being tensioned.

When the lashing belt 100 is wound in this manner, the battery module 20 having the integrated object (21A, 21B, 30, 40, 45, 50, 55, 60, 70, 80, and 90) and the lashing belt 100 is completed.

As shown in FIG. 1, four of the battery modules 20 are disposed inside a metal storage case 110. The storage case 110 includes a box-shaped case body 111 fixed to a vehicle body of the vehicle, and a lid part 112. An upper part of the case body 111 is opened. The lid part 112 detachably close the opened upper part of the case body 111. As shown in FIGS. 1, 13, and 14, a bottom plate part 111$a$ of the case body 111 is formed of a horizontal plate.

A plurality of cushion members 113A and 113B shown in FIGS. 4 and 13 are fixed to the bottom plate part 111$a$. Each of the cushion members 113A and the cushion members 113B is a long plate-like member. More specifically, as shown in FIG. 4, four of the cushion members 113A and two of the cushion members 113B are arranged for one battery module 20. Four of the cushion members 113A include two of the cushion members 113A located on the left side and two of the cushion members 113A located on the right side. A gap S is provided between the cushion member 113A on the left side and the cushion member 113A on the right side. A pair of the right and left cushion members 113B is disposed between two of the cushion members 113A located at the front side and two of the cushion members 113A located at the rear side. The dimension (width) of the cushion member 113B in the front-rear direction is larger than the dimension of the cushion member 113A in the front-rear direction. A gap S is also provided between the right and left cushion members 113B.

As shown in FIG. 13, the front second lower fixture 55 of the battery module 20 is placed on the upper surface of the front left and right cushion members 113A, and the rear second lower fixture 55 is placed on the upper surface of the rear left and right cushion members 113A. Although not shown, the front and rear first lower fixtures 45 are placed on the upper surfaces of the right and left cushion members 113B. As shown in FIGS. 4 and 14, the lower part of the belt 101 is located in each of the gaps S.

Figure 12:
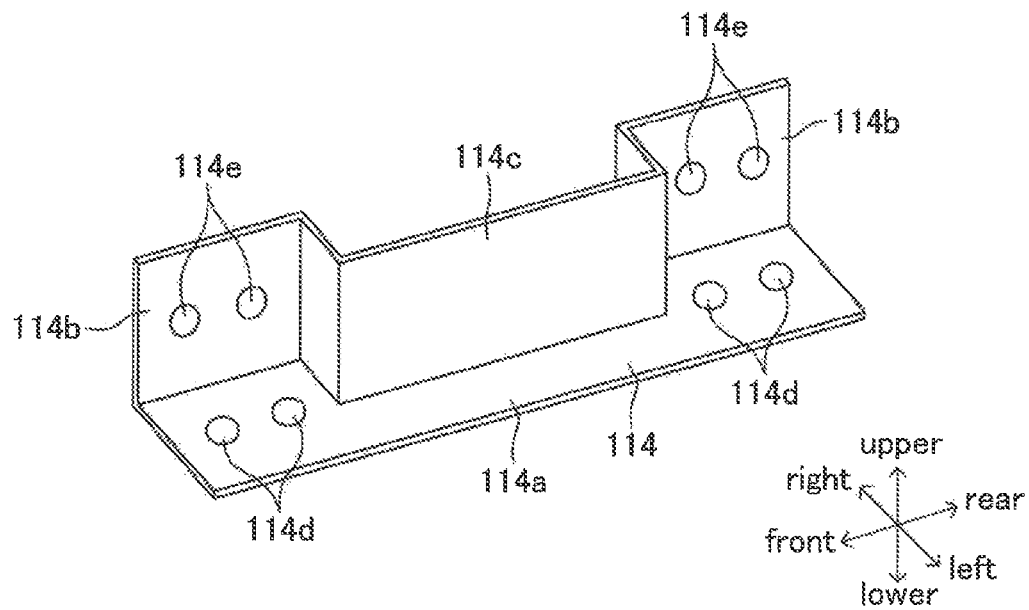
FIG. 12 is an enlarged perspective view of the fixing bracket shown in FIG. 4.

As shown in FIG. 4, the battery device 10 includes a plurality of fixing brackets 114. The fixing bracket 114 is made of metal. As shown in FIG. 12, the fixing bracket 114 includes a bottom piece 114$a$, upright pieces 114$b$, and a contact avoiding part 114$c$. The planar shape of the contact avoidance part 114$c$ of the fixing bracket 114 on the left side (i.e., the left fixing bracket 114) is substantially U-shaped. The rear edge part of the front upright piece 114$b$ is connected to the right edge part of the front end part of the contact avoiding part 114$c$, and the front edge part of the rear upright piece 114$b$ is connected to the right edge part of the rear end part of the contact avoiding part 114$c$. The shape of the right side edge part of the bottom piece 114$a$ of the left fixing bracket 114 is the same as the planar shape of the unitary body composed of the front and rear upright pieces 114$b$ and the contact avoiding part 114$c$. The lower ends of the front and rear upright pieces 114$b$ and the contact avoiding part 114$c$ are connected to the right side edge part of the bottom piece 114$a$. Two through holes 114$d$ are formed in the front part of the bottom piece 114$a$, and two through holes 114$d$ are formed in the rear part of the bottom piece 114$a$. Two through holes 114$e$ are respectively formed in the front and rear upright pieces 114$b$. The right fixing bracket 114 is symmetrical with the left fixing bracket 114.

As shown in FIGS. 9 and 13, the left fixing bracket 114 is disposed such that the contact avoidance part 114$c$ thereof is positioned directly below the tube connection part 81 of the left connection attachment 80. At this time, the front and rear upright pieces 114b are brought into contact with the left side surfaces of the front and rear end members 30, respectively. In this state, the head part B1a of the bolt B1 inserted into the through hole 48a of the left end surface part 48 of each of the front and rear first lower fixtures 45 is located in a space formed by the front and rear end surface parts 48 and the contact avoiding part 114c, and does not contact the contact avoiding part 114c. Four of the bolts B4 are inserted into the through holes 114e of the front and rear upright pieces 114b, and screwed into the female screw holes 33 of the front and rear end members 30, respectively. As a result, the head B4a of each of the bolts B4 is pressed against each of the upright pieces 114b. Further, four of bolts B5 are inserted into four through holes 114d formed in the bottom piece 114a of the left fixing bracket 114, and are screwed into four female screw holes (not shown) formed in the bottom plate part 111a, respectively. As a result, the head B5a of each of the bolt B5 is pressed against the upper surface of the bottom piece 114a. In this manner, a left end (the left end members 30) of the battery module 20 is fixed to the bottom plate part 111a with the left fixing bracket 114. Similarly, although not shown, a right end (the right end members 30) of the battery module 20 is fixed to the bottom plate part 111a with the right fixing bracket 114.

As shown in FIG. 1, the fluid circulation unit 120 is connected to "each of the battery modules 20, each fixed to the bottom plate 111a". The fluid circulation unit 120 includes a delivery tube 121, a return tube 122, and a heat exchange device 123.

The delivery tube 121 extends in the front-rear direction so as to extend along the left side surfaces of four of the battery modules 20 and pass above a plurality of the connection attachments 80 on the left side. The delivery tube 121 extends from a position in front of the most front battery module to a position "between the first battery stack 21A and the second battery stack 21B" of the rearmost battery module 20, and its rear end is closed. Connection passage parts (not shown) are formed at a plurality of positions on the lower surface of the delivery tube 121. The connection passage part is connected to the tube connection hole 81b of the connection attachment 80 on the left side in a liquid-tight state.

The return tube 122 extends in the front-rear direction so as to extend along the right side surfaces of four of the battery modules 20 and to pass above a plurality of the right connection attachments 80. The return tube 122 extends from a position in front of the most front battery module to a position "between the first battery stack 21A and the second battery stack 21B" of the rearmost battery module 20, and its rear end is closed. Connection passage parts (not shown) are formed at a plurality of positions on the lower surface of the return tube 122. The connection passage part is connected to the tube connection hole 81b of the connection attachment 80 on the right side in an air-tight state.

The delivery tube 121 and the return tube 122 pass through unillustrated through holes formed in the case body 111. A front end of the delivery tube 121 and the front end of the return tube 122 are connected to the heat exchange device 123. The heat exchange device 123 is fixed to the vehicle body so as to be located outside the storage case 110 and above the left connection attachments 80. The heat exchange device 123 is exposed to the outside of the vehicle, and is capable of exchanging heat with the outside air of the vehicle.

An inner/internal space of the temperature adjusting member 70, the left and right connection attachments 80, the delivery tube 121, the return tube 122, and the heat exchange device 123 constitute a single closed refrigerant (cooling medium) circulation path 124. A predetermined amount of the refrigerant (cooling medium) RF shown in FIG. 14 is stored in the refrigerant circulation path 124. The refrigerant RF becomes a liquid phase (liquid) or a gas phase (gas) depending on the temperature.

Next, the operation of the battery device 10 will be described.

When each of the battery cells 22 of each of the battery modules 20 of the battery device 10 performs a charging operation or a discharging operation, each of the battery cells 22 generates heat that raises the temperature of each of the battery cells 22. Then, each of the battery cells 22 is cooled by the refrigerant RF flowing through the refrigerant circulation path 124. Operation of cooling using the refrigerant RF, the temperature adjustment member 70, and the liquid circulation unit 120 is well known as disclosed in Japanese Patent No. 5942943. Therefore, this cooling operation will not be described in detail in this specification, but will be briefly described below.

As shown in FIG. 14, the liquid-phase refrigerant RF is present in the lower part of the inner space of the temperature adjusting member 70 and in the delivery tube 121. The liquid-phase refrigerant RF has a temperature lower than that of the battery cell 22. When each of the battery cells 22 generates heat, the heat generated in each of the battery cells 22 is transferred to the insulation heat transfer sheet 60, then from the insulation heat transfer sheet 60 to the refrigerant RF in the temperature adjusting member 70 via the heat exchange part 73 or the heat exchange part 74. Thus, the refrigerant RF in the temperature adjusting member 70 is heated by the heat generated by the battery cells 22, and in turn, the battery cells 22 from which heat is removed by the refrigerant RF are cooled. Therefore, since the temperature of each of the battery cells 22 is maintained within a predetermined appropriate temperature range, each of the battery cells 22 can efficiently perform the charging operation and the discharging operation.

The heated refrigerant RF evaporates into a gas (the gas phase) and rises to the upper part of the inner space of the temperature adjusting member 70. Since the gas-phase refrigerant RF has a high pressure, the gas-phase refrigerant RF causes each of the inner spaces of the respective temperature-adjusting members 70 to have a high pressure, e.g., 2 MPa. The gas-phase refrigerant RF flows to the heat exchange device 123 through the second connection hole 72, the fluid through hole of the right connection attachment 80, and the return tube 122. When the gas-phase refrigerant RF reaches the heat exchange device 123, the gas-phase refrigerant RF is cooled by the heat exchange device 123 which is cooled by the outside air having a temperature lower than that of the gas-phase refrigerant RF. This causes the temperature of the refrigerant RF inside the heat exchange device 123 to drop to the same temperature as the outside air temperature, and therefore, the gas-phase refrigerant RF is condensed to change into the liquid phase refrigerant RF. The liquid phase refrigerant RF flows from the heat exchange device 123 to the delivery tube 121 and flows by gravity into the inner space of each of the temperature adjusting members 70 through each of the left connecting attachments 80. In this manner, the refrigerant RF in the refrigerant circulation path 124 circulates in the refrigerant circulation path 124 by utilizing the temperature difference between the battery cell 22 and the outside air and the height difference between each of the left connection attachments 80 and the heat exchange device 123.

Incidentally, in order to uniformly cool each of the battery cells 22 using the heat exchange with the refrigerant RF in the temperature adjusting member 70, it is necessary to bring each of the battery cells 22 into contact with the insulation heat transfer sheet 60 with substantially uniform force applied to each of the battery cells 22.

Figure 15:
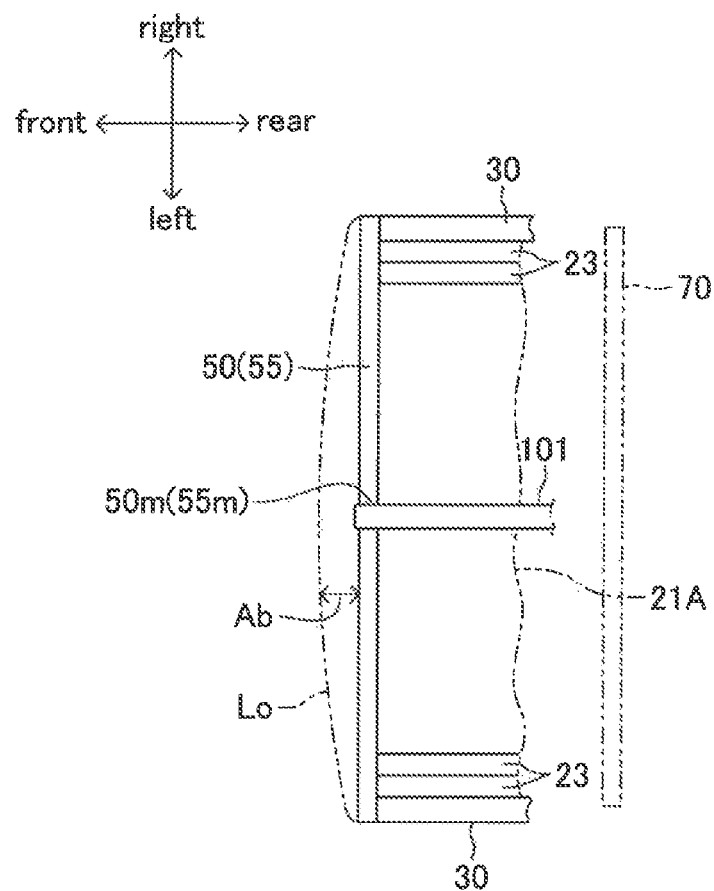
FIG. 15 is a schematic plan view of the end members, the second upper fixture (second lower fixture), and the lashing belt, according to the embodiment of the present invention.

Since each of the first battery stack 21A and the second battery stack 21B is sandwiched in the front-back direction between "the side surface parts 51 and 56" and "each of the insulation heat transfer sheets 60", each of the insulation heat transfer sheets 60 having elasticity generates a force F1 in the direction indicated by the arrows in FIG. 14. The force F1 applied to the first battery stack 21A presses/pushes the first battery stack 21A against the side surface 51 of the front second upper fixture 50 and the side surface 56 of the front second lower fixture 55. The force F1 applied to the second battery stack 21B presses/pushes the second battery stack 21B against the side surface 51 of the rear second upper fixture 50 and the side surface 56 of the rear second lower fixture 55. Each of the second upper fixtures 50 and each of the second lower fixtures 55 can be regarded as a double-ended beam supported at both ends by the left and right end members 30. Therefore, as indicated by an imaginary line Lo in FIG. 15, each of the second upper fixture 50 and the second lower fixture 55 tends to bend in the direction away from the temperature adjusting member 70 in a plan view by the force F1. Therefore, if the lashing belt 100 is not wound around the battery module 20, a deflection amount Ab of the second upper fixture 50 is minimum at the both sides of the second upper fixture 50, and gradually increases at a position closer to the center part 50m. That is, the deflection amount Ab of the second upper fixture 50 is the largest (maximum) at the center part 50m. Similarly, if the lashing belt 100 is not wound around the battery module 20, a deflection amount Ab of the second lower fixture 55 is minimum at the both sides of the second lower fixture 55, and gradually increases at a position closer to the center part 55m. That is, the deflection amount Ab of the second lower fixture 55 is the largest (maximum) at the center part 55m.

When each of the front second upper fixture 50 and the front second lower fixture 55 is bent in the above manner, the position in the front-rear direction of one of the battery cells 22 located at the center part in the left-right direction of the first battery stack 21A (i.e., the battery cell 22 which opposes the center part 50m of the front second upper fixture 50 and the center part 55m of the front second lower fixture 55, and hereinafter, may be referred to as "a specific front center cell") moves forward (in the front direction) as compared to the other battery cells 22 of the first battery stack 21A. Similarly, when each of the rear second upper fixture 50 and the rear second lower fixture 55 is bent in the above manner, the position in the front-rear direction of one of the battery cells 22 located at the center part in the left-right direction of the second battery stack 21B (i.e., the battery cell 22 which opposes the center part 50m of the rear second upper fixture 50 and the center part 55m of the rear second lower fixture 55, and hereinafter, may be referred to as "a specific rear center cell") moves backward (in the rear direction) as compared to the other battery cells 22 of the second battery stack 21B. That is, in this case, the contact force of the specific front center cell to the front insulation heat transfer sheet 60 is smaller than that of the battery cells 22 other than the specific front center cell in the first battery stack 21A, and the contact force of the specific rear center cell to the rear insulation heat transfer sheet 60 is smaller than that of the battery cells 22 other than the specific rear center cell in the second battery stack 21B. Therefore, in this case, the battery cells 22 of the first battery stack 21A and the second battery stack 21B cannot be uniformly cooled.

However, in the present embodiment, the belt 101 applies/exerts a force to the center parts 50m of the front and rear second upper fixtures 50 and the center parts 55m of the front and rear second lower fixtures 55 to thereby substantially prevent/regulate the bending (indicated by the imaginary line Lo) of the center parts 50m and 55m. The belt 101 is made of polyparaphenylene terephthalamide which is a material having a strong tensile strength. In other words, in the present embodiment, the deflection amount Ab is kept substantially the same at any position in the longitudinal direction (the left-right direction) of the second upper fixture 50 and the second lower fixture 55. Therefore, even if the front and rear insulating heat transfer sheets 60 generate the force F1, the battery cells 22 of the first battery stack 21A and the second battery stack 21B contact the insulating heat transfer sheets 60 with substantially the same/uniform force, and thus, the battery cells 22 are uniformly cooled. Accordingly, the performance of each of the battery cells 22 is kept stable.

Furthermore, in the present embodiment, the first battery stack 21A, the second battery stack 21B, and the temperature adjusting member 70 are arranged in the horizontal direction (or on the same horizontal plane). In other words, the temperature adjusting member 70 is not positioned directly below or directly above the first battery stack 21A and the second battery stack 21B. Therefore, it is possible to reduce/downsize the vertical dimension of the battery module 20.

In addition, the ceiling part 42 of each of the first upper fixtures 40 and the ceiling part 52 of each of the second upper fixtures 50 contact the upper surface of each of the covers 23, and the bottom plate part 47 of each of the first lower fixtures 45 and the bottom plate part 57 of each of the second lower fixtures 55 contact the lower surface of each of the covers 30. The first upper fixtures 40, the first lower fixtures 45, the second upper fixtures 50, and the second lower fixtures 55 are integrated with the end members 30, and the end members 30 are fixed to the bottom plate part 111a of the "storage case 110 fixed to the vehicle body" by using the fixing brackets 114. Accordingly, the first upper fixtures 40, the first lower fixtures 45, the second upper fixtures 50, and the second lower fixtures 55 can prevent each of the battery cells 22 from vibrating greatly in the vertical direction relative to the temperature adjusting member 70 when the vehicle is traveling.

The embodiment of the present invention has been described, however, the present invention is not limited to the embodiment, and various modifications can be made without departing from the purpose of the present invention.

Figure 16:
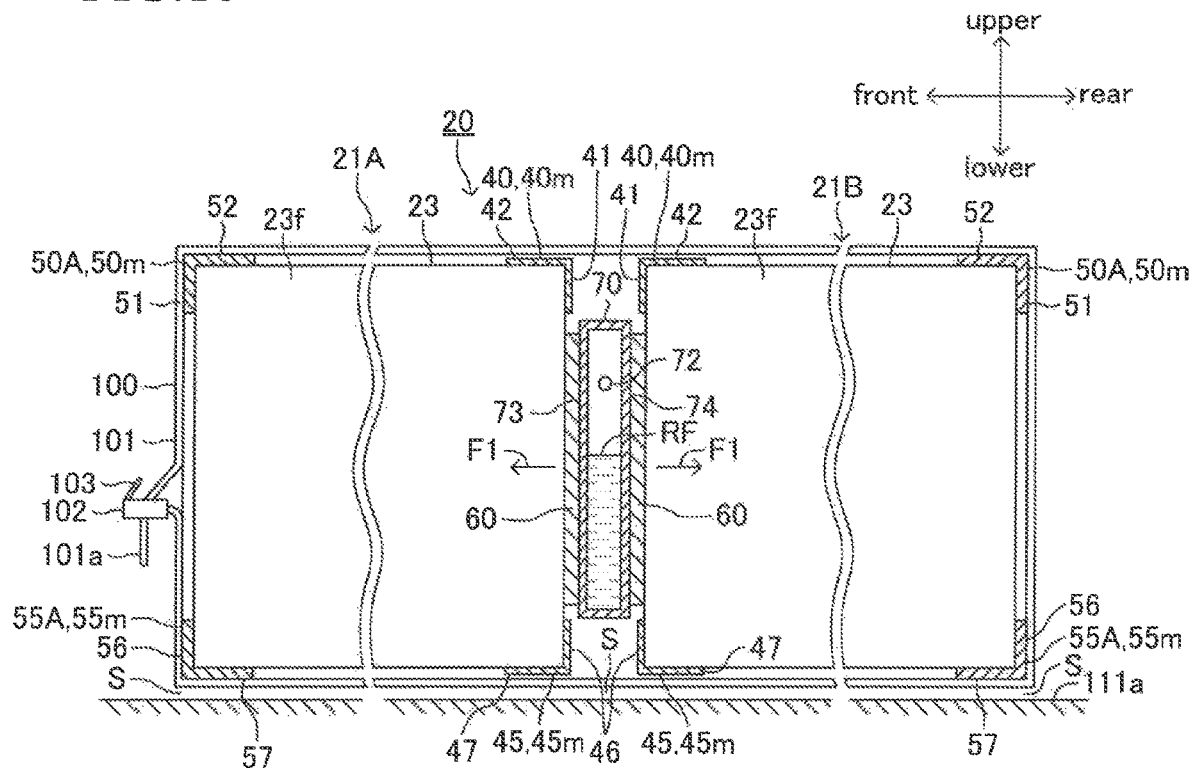
FIG. 16 is a schematic cross-sectional view corresponding to FIG. 14 of a first modification of the present invention.

For example, a first modification shown in FIG. 16 may be employed when implementing the present invention. In the first modification, the plate thicknesses of the second upper fixture 50A and the second lower fixture 55A are the same as each other, and are thicker/larger than the plate thicknesses of the first upper fixture 40 and the first lower fixture 45. Therefore, when the belt 101 is wound around the center parts 50m of the second upper fixtures 50A and the center parts 55m of the second lower fixtures 55A, the belt 101 is separated from the first upper fixtures 40 and the first lower fixtures 45 to the outer circumferential side. However, since the belt 101 comes into contact with each of the side surface parts 51 of the second upper fixtures 50A and each of the side surface parts 56 of the second lower fixtures 55A with a strong force while being tensioned, the first modification exhibits the same operation and effect as those of the above embodiment.

Figure 17:
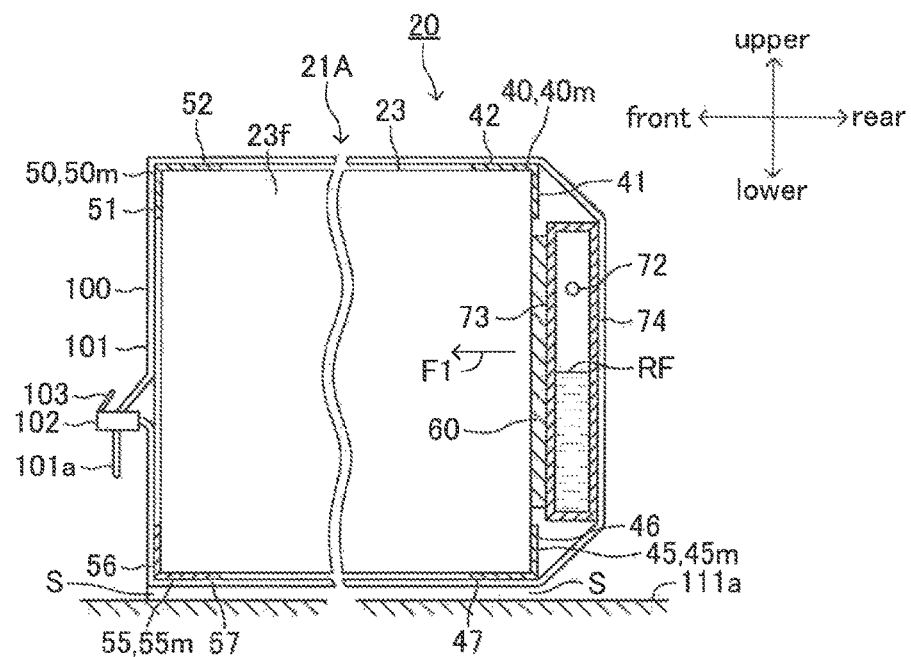
FIG. 17 is a schematic cross-sectional view corresponding to FIG. 14 of a second modification of the present invention.

A second modification shown in FIG. 17 may be employed when implementing the present invention. In the second modification, the insulation heat transfer sheet 60 contacts only the heat exchange part 73 of the temperature adjusting member 70 (i.e., the sheet 60 does not contact the heat exchange part 74), and the first battery stack 21A contacts the insulation heat transfer sheet 60. That is, each of the battery modules 20 includes one battery stack (first battery stack 21A), one insulation heat transfer sheet 60, a temperature adjusting member 70, a first upper fixture 40, a first lower fixture 45, a second upper fixture 50, a second lower fixture 55, a pair of left and right end members 30, a pair of left and right connection attachments 80, a pair of left and right connection brackets 90, and a lashing belt 100. In this case, the end members 30 of the battery module 20 is fixed to the bottom plate part 111a using unillustrated L-shaped brackets. This second modification also exhibits the same operation and effect as those of the above embodiment. The second modification may be implemented in such a manner that the insulation heat transfer sheet 60 contacts only the heat exchange part 74 of the temperature adjusting member 70 and the second battery stack 21B contacts the insulation heat transfer sheet 60.

Figure 18:
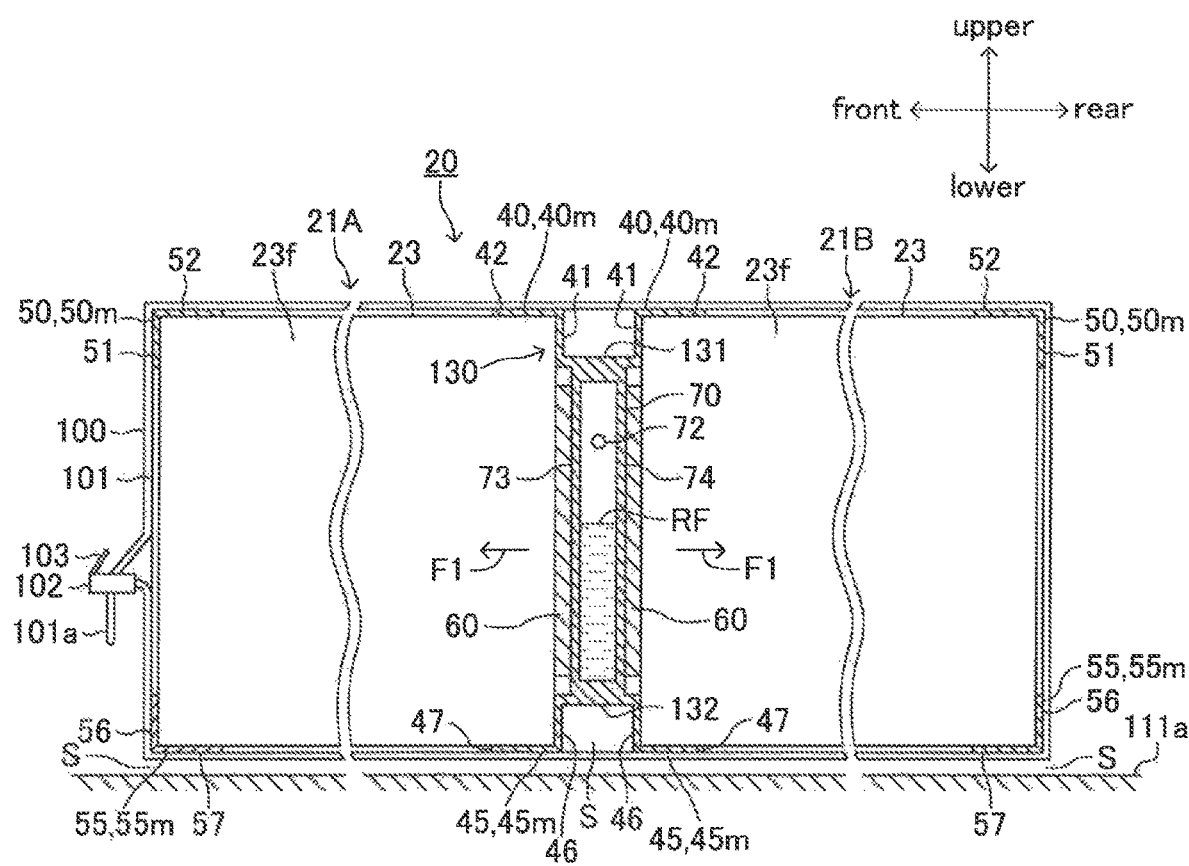
FIG. 18 is a schematic cross-sectional view corresponding to FIG. 14 of a third modification of the present invention.

A third modification shown in FIG. 18 may be employed when implementing the present invention. In the third modification, the temperature adjusting member 70, the pair of front and rear first upper fixtures 40, and the pair of front and rear first lower fixtures 45 are integrated (united into one piece). In other words, the battery module 20 of the third modification includes an elongate member 130 integrally including the temperature adjusting member 70, an upper connection piece 131, a lower connection piece 132, a pair of the first upper fixtures 40, and a pair of the first lower fixtures 45. The upper connection piece 131 is fixed to an upper end of the temperature adjusting member 70, and has "a width in the front-rear direction" wider than "the width in the front-rear direction of the temperature adjusting member 70". The lower connection piece 132 is fixed to a lower end of the temperature adjusting member 70, and has "a width in the front-rear direction" wider than "the width in the front-rear direction of the temperature adjusting member 70". A pair of the first upper fixtures 40 include a front first upper fixture 40 and a rear first upper fixture 40. A lower end of each of a pair of the first upper fixtures 40 is connected/fixed to the upper connection piece 131. A pair of the first lower fixtures 45 include a front first first lower fixture 45 and a rear first first lower fixture 45. An upper end of each of a pair of the first lower fixtures 45 is connected/fixed to the lower connection piece 132. The thus configured third modification also exhibits the same operation and effect as those of the above embodiment. Furthermore, since the temperature adjusting member 70, a pair of the front and rear first upper fixtures 40, and a pair of the front and rear first lower fixtures 45 are integrated/united, the battery module 20 of the third modification can be assembled more easily as compared to the above embodiment.

Figure 19:
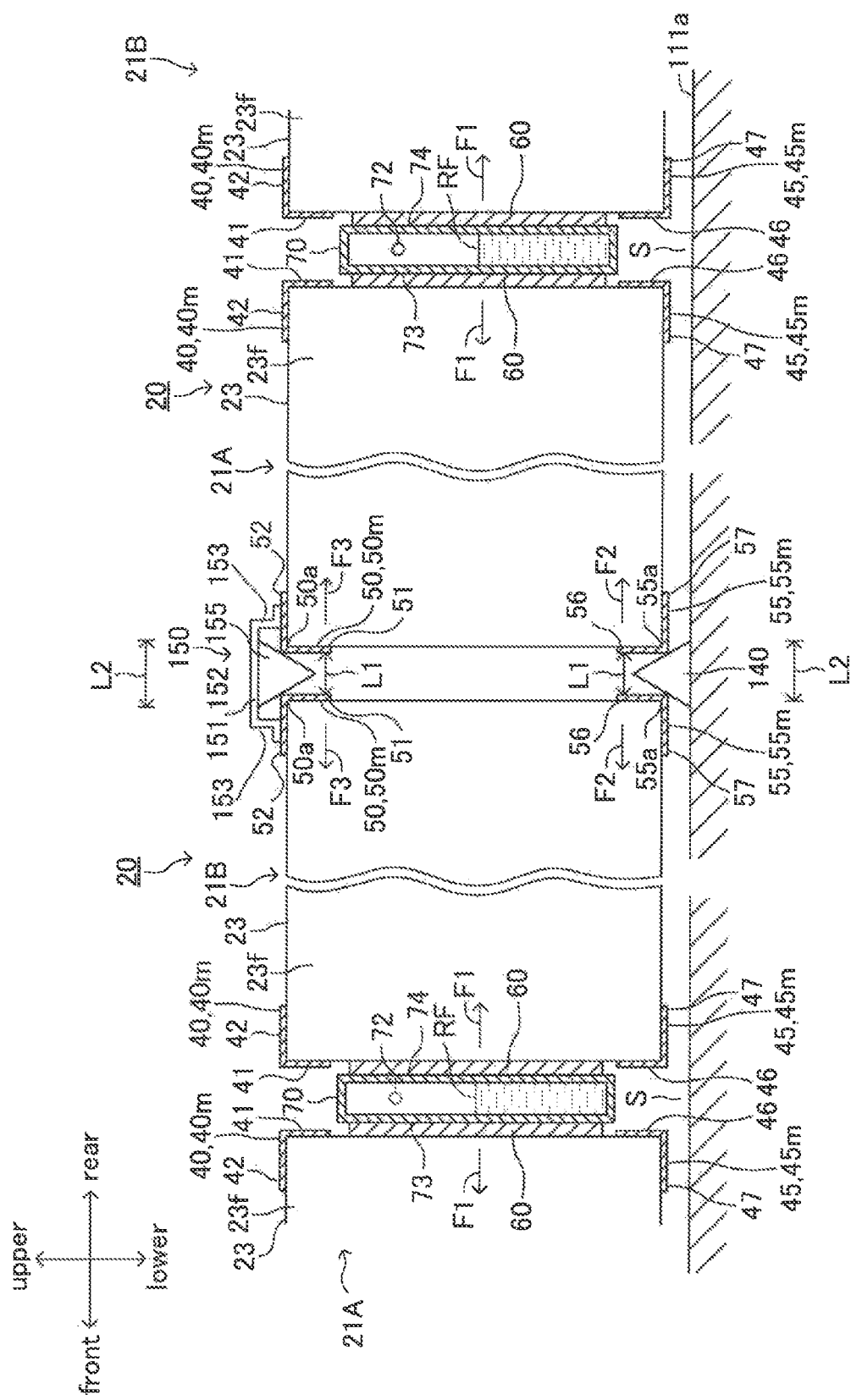
FIG. 19 is a schematic cross-sectional view corresponding to FIG. 14 of a fourth modification of the present invention.

A fourth modification shown in FIG. 19 may be employed when implementing the present invention. As described later in detail, the fourth modification employs a lower wedge member 140 and an upper wedge device 150, in place of the belt 101, to bring each of the battery cells 22 into contact with each of the insulation heat transfer sheets 60 with substantially the uniform/same force.

As shown in FIG. 19, a distance in the front-rear direction between the side surface parts 51 adjacent to (opposite to) each other in the front-rear direction is L1. One of the side surface parts 51 adjacent to each other is attached to one of the two adjacent battery modules 20, and the other one of the side surface parts 51 adjacent to each other is attached to the other one of the two adjacent battery modules 20. Similarly, a distance in the front-rear direction between the side surface parts 56 adjacent to (opposite to) each other in the front-rear direction is also L1. One of the side surface parts 56 adjacent to each other is attached to the one of the two adjacent battery modules 20, and the other one of the side surface parts 56 adjacent to each other is attached to the other one of the two adjacent battery modules 20. The fourth modification includes five of the lower wedge members 140. Each of the lower wedge members 140 is made of metal. There are three places/positions, each corresponding to a space between two of the battery modules 20 adjacent to each other. Each of the lower wedge members 140 is fixed to the bottom plate part 111a at each of the three places/positions by welding. Note that FIG. 19 illustrates only one of the lower wedge members 140 and only one of the upper wedge devices 150. In addition, although not shown, the lower wedge member 140 is fixed to the bottom plate part 111a at a place/position immediately in front of the most front first battery stack 21A by welding, and the lower wedge member 140 is fixed to the bottom plate part 111a at a place/position immediately in rear of the most rear second battery stack 21B by welding. Each of the lower wedge members 140 has a triangular prism shape whose axis extends in the left-right direction. A bottom surface of each of the lower wedge members 140 is fixed to the bottom plate part 111a. A dimension of the bottom surface of the lower wedge member 140 in the front-rear direction is L2, which is larger/longer than L1. Each of the lower wedge members 140 has an isosceles triangle shape in cross section view cut by a plane perpendicular to its axis. The axial length (left-right direction dimension) of each of the lower wedge members 140 is substantially the same as the left-right dimension of the battery cell 22 (cover 23). Each of the lower wedge members 140 is positioned so as to oppose/face the center part 55m of each of the second lower fixtures 55 in the front-rear direction. The second lower fixture 55 has a corner part 55a formed by the side surface part 56 thereof and the bottom plate part 57 thereof. The corner parts 55a of a pair of the second lower fixtures 55 located on both sides of each of the lower wedge members 140 in the front-rear direction are in pressure contact with front and rear surfaces of the lower wedge member 140, respectively. In other words, the lower wedge member 140 bites between the corner part 55a at the front side and the corner part 55a at the rear side. Therefore, as shown in FIG. 19, the side surface part 56 at the front side in contact with the lower wedge member 140 applies a force F2 in the direction indicated by the arrow to the cover 23 at the front side, and the side surface part 56 at the rear side in contact with the lower wedge member 140 applies a force F2 in the direction indicated by the arrow to the cover 23 at the rear side.

Furthermore, each of the upper wedge devices 150 is fixed to the upper surfaces of the ceiling parts 52 of two of the battery modules 20 adjacent to each other. Each of the upper wedge devices 150 has a connecting member 151 made of metal and a wedge member 155 made of metal. The connecting member 151 includes a supporting part 152 extending in the front-rear direction (the left-right direction), and a pair of fixed parts 153. Each of a pair of the fixed parts 153 has an L-shape in a cross section. One of a pair of the fixed parts 153 is connected to a front end of the supporting part 152, and the other one of a pair of the fixed parts 153 is connected to a rear end of the supporting part 152. The upper surface of the wedge member 155 is fixed to the lower surface of the supporting part 152. The wedge member 155 is vertically symmetrical with the lower wedge member 140. Thus, the dimension of the upper surface of the wedge member 155 in the front-rear direction is L2. The dimension of the connecting member 151 in the left-right direction is the same as that of the wedge member 155 in the left-right direction. A position of a left end of the connecting member 151 in the left-right direction is the same as that of the wedge member 155 in the left-right direction, and a position of a right end of the connecting member 151 in the left-right direction is the same as that of the wedge member 155 in the left-right direction.

Each of the lower surfaces of the fixed parts 153 of the connecting member 151 is fixed to each of the upper surfaces of the ceiling parts 52 of the two second upper fixtures 50 of the two battery modules 20 adjacent to each other, by welding. Each of the wedge members 155 opposes the center part 50m of each of the second upper fixtures 50 in the front-rear direction. The second upper fixture 50 has a corner part 50a formed by the side surface part 51 thereof and the ceiling part 52 thereof. The corner parts 50a of a pair of the second upper fixtures 50 located on both sides of the wedge member 155 in the front-rear direction are in pressure contact with the front and rear surfaces of the wedge members 155, respectively. In other words, the wedge members 155 bites between the corner part 50a at the front side and the corner part 50a at the rear side. Therefore, as shown in FIG. 19, the side surface part 51 at the front side in contact with the wedge members 155 applies a force F3 in the direction indicated by the arrow to the cover 23 at the front side, and the side surface part 51 at the rear side in contact with the wedge members 155 applies a force F3 in the direction indicated by the arrow to the cover 23 at the rear side.

In this manner, the lower wedge member 140 and the upper wedge device 150 apply the forces F2 and F3 to the center parts 50m and 55m. Thus, the deflection amount Ab described with reference to FIG. 15 becomes substantially the same at any position in the longitudinal direction of the second upper fixture 50 and the second lower fixture 55. Therefore, even if the front and rear insulating heat transfer sheets 60 generate the force F1, the battery cells 22 of the first battery stack 21A and the second battery stack 21B contact the insulating heat transfer sheets 60 with substantially the uniform/same force. Accordingly, the performance of the battery cells 22 is kept stable.

Figure 20:
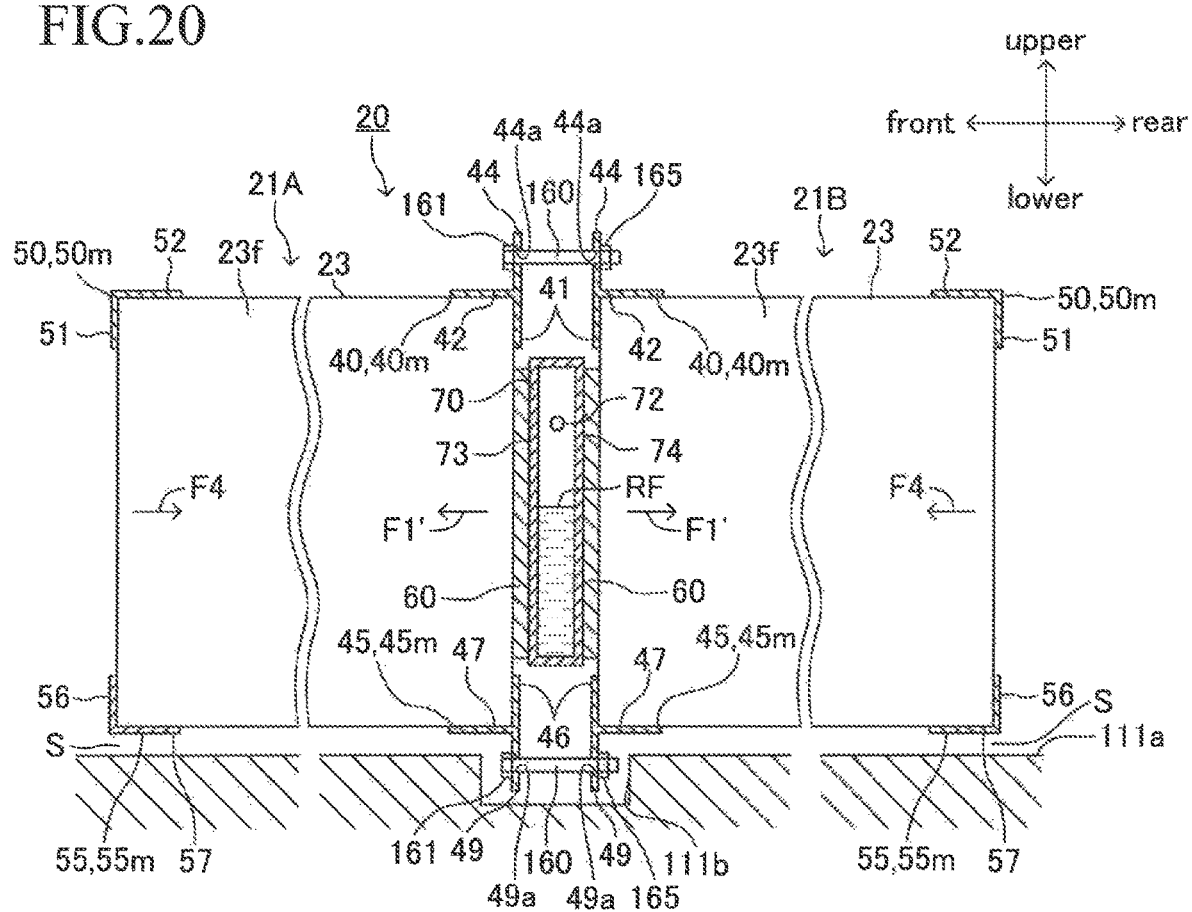
FIG. 20 is a schematic cross-sectional view corresponding to FIG. 14 of a fifth modification of the present invention.
Figure 21:
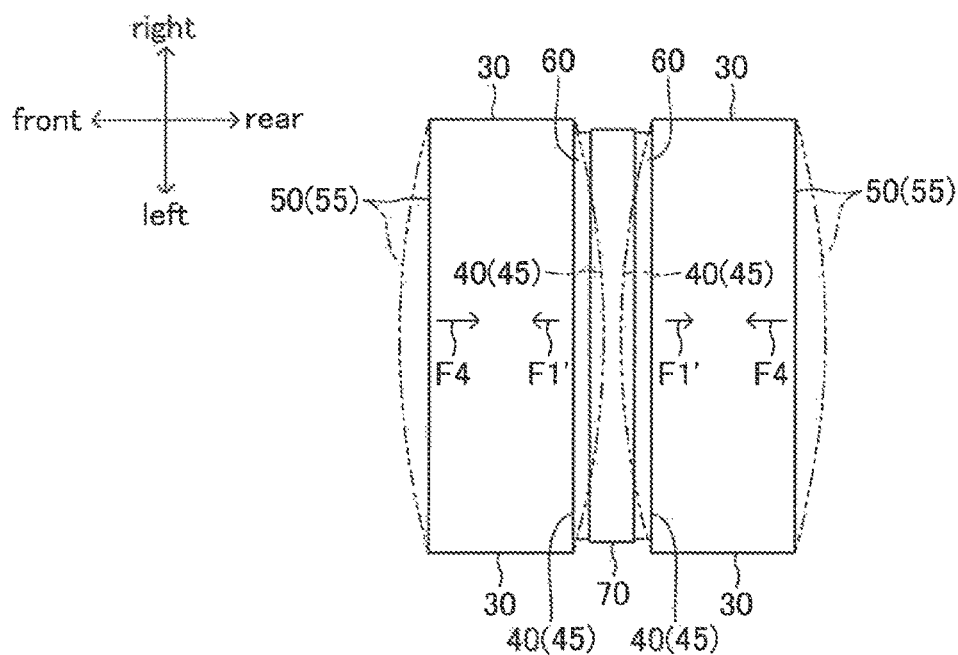
FIG. 21 is a schematic plan view for explaining the operation of the fifth modification of the present invention.

A fifth modification shown in FIGS. 20 and 21 may be employed when implementing the present invention. As described later in detail, the fifth modification uses, in place of the belt 101, pressed parts 44, pressed parts 49, the bolts 160, and the nuts 165 to bring each of the battery cells 22 into contact with the insulation heat transfer sheets 60 with substantially the uniform/same force. In the fifth modification, an "inward" means a direction toward the temperature adjusting member 70 relative to the first battery stack 21A and the second battery stack 21B in the single battery module 20. Furthermore, in the fifth modification, an "outward" means a direction toward the side surface parts 51 and 56 of the first battery stack 21A from the temperature adjusting member 70 or a direction toward the side surface parts 51 and 56 of the second battery stack 21B from the temperature adjusting member 70.

As shown in FIG. 20, the pressed part 44 is provided at the first upper fixture 40 of the battery module 20 of the present modification at the center part 40m. The pressed part 44 extends upward from the upper end of the side surface part 41. Similarly, the pressed part 49 is provided at the first lower fixture 45 of the battery module 20 at the center part 45m. The pressed part 49 extends downward from the lower end of the side surface part 46. Each of the dimensions of the pressed part 44 and the pressed part 49 in the left-right direction is substantially the same as the dimension of the battery cell 22 (i.e., the cover 23) in the left-right direction. A through hole 44a is formed in the pressed part 44, and a through hole 49a is formed in the pressed part 49. In addition, recesses 111b are formed at three positions of the bottom plate 111a. Note that FIG. 20 illustrates only one recess 111b.

After the first battery stack 21A, the second battery stack 21B, the end members 30, the first upper fixtures 40, the first lower fixtures 45, the second upper fixtures 50, the second lower fixtures 55, the insulation heat transfer sheets 60, and the temperature adjusting member 70 are integrated using the connection attachments 80, and the connecting brackets 90 (not shown in FIGS. 20 and 21), and before the bolts 160 described later and the nuts 165 described later make the pressed parts 44 adjacent to each other come closer to each other and make the pressed parts 49 adjacent to each other come closer to each other, each of the side surface parts 41 is apart inward from the corresponding covers 23 and each of the side surface parts 46 is apart inward from the corresponding covers 23.

As shown in FIG. 20, the bolt 160 made of metal is inserted from the front into the through holes 44a of the front and rear pressed parts 44, and is screwed into the nut 165 made of metal positioned immediately behind the rear pressed part 44. The head 161 of the bolt 160 is in pressure contact with the front surface of the front pressed part 44, and the nut 165 is in pressure contact with the rear surface of the rear pressed part 44. The first upper fixture 40, which has a substantially straight line shape in plan view as shown by the solid line of FIG. 21 before the bolt 160 and the nut 165 are attached to the pressed parts 44, curves inward as shown by the imaginary line of FIG. 21 after the bolt 160 and the nut 165 are attached to the pressed parts 44. In addition, the front-rear direction distance between the left end parts of the front and rear first upper fixtures 40 and the front-rear direction distance between the right end parts of the front and rear first upper fixtures 40 are shortened by a minute distance, as compared to before the bolt 160 and the nut 165 are attached to the pressed parts 44.

Furthermore, as shown in FIG. 20, the bolt 160 made of metal is inserted from the front into the through holes 49a of the front and rear pressed parts 49, and is screwed into the nut 165 made of metal positioned immediately behind the rear pressed part 49. The head 161 of the bolt 160 is in pressure contact with the front surface of the front pressed part 49, and the nut 165 is in pressure contact with the rear surface of the rear pressed part 49. The first lower fixture 45, which has a substantially straight line shape in plan view as shown by the solid line of FIG. 21 before the bolt 160 and the nut 165 are attached to the pressed parts 49, curves inward as shown by the imaginary line of FIG. 21 after the bolt 160 and the nut 165 are attached to the pressed parts 49. In addition, the front-rear direction distance between the left end parts of the front and rear first lower fixtures 45 and the front-rear direction distance between the right end parts of the front and rear first lower fixtures 45 are shortened by a minute distance, as compared to before the bolt 160 and the nut 165 are attached to the pressed parts 49. That is, the front and rear end members 30 move/shift by a small distance in the front-rear direction (inwardly). It should be noted that, as shown in FIG. 20, the lower part of the pressed part 49 with the bolt 160 and the nut 165 is located in the recess 111b.

When each of the first upper fixtures 40 and each of the first lower fixtures 45 are deformed in the above described manner, the distance in left-right direction between the left and right end members 30 fixed to both ends of each of the first upper fixtures 40 and each of the first lower fixtures 45 is slightly shortened. Therefore, the second upper fixtures 50 and the second lower fixtures 55, which have been substantially linear in plan view as shown by the solid line of FIG. 21 before the bolts 160 and the nuts 165 are attached to the pressed parts 44 and 49, are slightly curved outward as shown by the imaginary line of FIG. 21.

Since the distance in the left and right direction between the left and right end members 30 is shortened in this manner, the force by which the left and right end members 30 of the first battery stack 21A sandwich the first battery stack 21A and the force by which the left and right end members 30 of the second battery stack 21B sandwich the second battery stack 21B are increased. Therefore, when the end members 30 move in the front-rear direction (inward) as described above, each battery cell 22 (cover 23) moves by substantially the same distance in the same direction (inward) as the corresponding end members 30. In other words, due to the inward movement of each end member 30, forces F4 in the direction indicated by the arrows in FIGS. 20 and 21 are generated in the battery cells 22 (covers 23). Since the first battery stack 21A and the second battery stack 21B are brought into contact with the corresponding insulation heat transfer sheet 60 by the forces F4, each insulation heat transfer sheet 60 generates forces F1' (force F1'>force F1) in the direction indicated by the arrows in FIGS. 20 and 21. Consequently, each of the battery cells 22 receiving the force F4 comes into contact with the insulation heat transfer sheet 60 with substantially the same/uniform force when the forces F1 is generated, each of the battery cells 22 is uniformly cooled. Accordingly, the performance of each battery cell 22 is kept stable.

In the above embodiment and each modification, the fluid circulation unit 120 may be equipped with an electric pump (not shown), and cooling water may be used in place of the refrigerant RF. In this case, when the electric pump is driven/operated, the cooling water is circulated in the fluid circulation unit 120 by the force generated by the electric pump. The heat generated in each battery cell 22 is transferred from each cover 23, each insulation heat transfer sheet 60, and one of the heat exchange parts 73 and 74 to the cooling water in the temperature adjusting member 70. Accordingly, the cooling water in the temperature adjusting member 70 is heated by the heat generated by the battery cells 22, and the battery cells 22 whose heat is deprived by the cooling water are cooled. Therefore, since the temperature of each battery cell 22 is maintained within the above-mentioned appropriate temperature range, the battery cell 22 can efficiently perform the charging operation and the discharging operation. Furthermore, the heated cooling water in the temperature adjusting member 70 flows through the return tube 122 to the heat exchange device 123. The cooling water is cooled by the heat exchange device 123 which is cooled by the outside air having a temperature lower than that of the heated cooling water. Thus, the temperature of the cooling water inside the heat exchange device 123 drops to the same temperature as the outside air temperature. The cooling water having a low temperature flows through the delivery tube 121 into the inner space of the temperature adjusting member 70 by the force generated by the electric pump.

The heat exchange device 123 may be brought into contact with an electric cooling device (not shown) installed in the vehicle. For example, when any one of the above-described embodiment and the above-described modifications is implemented in this fashion, the refrigerant RF or the cooling water radiates the heat to the heat exchange device 123 which is cooled by the cooling device. This allows the refrigerant RF or the cooling water to be sufficiently cooled. Therefore, even when the outside air temperature is extremely high (e.g., 50° C.), the temperature of each battery cell 22 is maintained within the above-mentioned appropriate temperature range.

The heat exchange device 123 may be brought into contact with an electric heating device (not shown) installed in the vehicle. In this case, the refrigerant RF or the cooling water can receive heat from the heating device through the heat exchange device 123. Thus, for example, when the outside air temperature is extremely low (e.g., −10° C.), the heated refrigerant RF or the heated cooling water can flow into the temperature adjusting member 70, and heats each battery cell 22 through the temperature adjusting member 70, the insulation heat transfer sheet 60, and the cover 23. Therefore, even when the outside air temperature is extremely low, the temperature of each battery cell 22 is maintained within the above-mentioned appropriate temperature range.

A minute gap may be formed between the ceiling part 42 of each first upper fixture 40 and the upper surface of each cover 23. A minute gap may be formed between the ceiling part 52 of each second upper fixture 50 and the upper surface of each cover 23. A minute gap may be formed between the bottom plate part 47 of each first lower fixture 45 and the bottom surface of each cover 23. A minute gap may be formed between the bottom plate part 57 of each second lower fixture 55 and the bottom surface of each cover 23.

Instead of the insulation heat transfer sheet 60, a heat transfer sheet having thermal conductivity and an insulating sheet having insulation properties may be used in the battery module 20. In this case, the heat transfer sheet and the insulating sheet are layered in their thickness direction. The insulating sheet may be brought into contact with one of the heat exchange parts 73 and 74, and the heat transfer sheet may be brought into contact with either one of the first battery stack 21A and the second battery stack 21B.

The belt 101 may be made of a material having a high tensile strength, other than polyparaphenylene terephthalamide.

The position of each of the lashing belt 100, the lower wedge member 140, the upper wedge device 150, and the bolt 160 and the nut 165 may be different from each of the center parts 40m, 45m, 50m, and 55m, as long as the position is closer to the each of the center parts 40m, 45m, 50m, and 55m than each of the left-right ends of the first upper fixture 40, the first lower fixture 45, the second upper fixture 50, and the second lower fixture 55.

The specific front center cell described above or the specific rear center cell described above may be a cell group including a plurality of (e.g., a few of) the battery cells 22 adjacent to each other. In this case, the left and right dimension of each of the center parts 40m, 45m, 50m, and 55m may be substantially the same as the left and right dimension of the cell group. In other words, each of the width of the lashing belt 100, the left and right dimension of the lower wedge member 140, the left and right dimension of the upper wedge device 150, and the left and right dimensions of the pressed parts 44 and 49 may be substantially the same as the left and right dimension of the cell group.

Each of the first upper fixture 40, the first lower fixture 45, the second upper fixture 50, the second lower fixture 55, the lower wedge member 140, the upper wedge device 150, the bolt 160, and the nut 165 may be made of a non-metallic hard material (e.g., a hard resin).

The battery module 20 may include the lashing belt 100, the pressed parts 44, the pressed parts 49, the bolts 160, and the nuts 165.

Similarly, the battery module 20 may include the lower wedge members 140, the upper wedge devices 150, the pressed parts 44, the pressed parts 49, the bolts 160, and the nuts 165.

In other words, a combination of two or more of the above embodiment and the modifications may be employed at the same time.

The battery device 10 may be mounted on an object (device) other than the vehicle.

What is claimed is:

1. A battery device comprising:
a battery stack including a plurality of battery cells arranged along a predetermined straight direction;
a pair of end members spaced apart from each other in said straight direction to sandwich said battery stack in said straight direction;
a heat transfer member having thermal conductivity and elasticity, which extends along said straight direction, and whose one of side surfaces contacts one of side surfaces of said battery stack;
a temperature adjusting member, extending along said straight direction and having on a side surface thereof a heat exchange part which contacts the other one of side surfaces of said heat transfer member, in which a fluid is flowing for performing heat exchange with said battery stack through said heat transfer member and said heat exchange part;
a first end member fixture, facing said one of side surfaces of said battery stack, extending along said straight direction, and fixing a pair of said end members;
a second end member fixture, facing the other one of said side surfaces of said battery stack, extending along said straight direction, and fixing a pair of said end members; and
an external force applying device, which applies a force to a specific battery cell of said battery cells via a first in-between part of said first end member fixture and/or a second in-between part of said second end member fixture, wherein said first in-between part is a part located at a position closer to a center part between both ends of said first end member fixture in said straight direction than said both ends of said first end member fixture, said second in-between part is a part located at a position closer to a center part between both ends of said second end member fixture in said straight direction than said both ends of said second end member fixture, said specific battery cell includes at least one of said battery cells and faces said first in-between part and said second in-between part, and said force is a force for causing said specific battery cell to move toward said temperature adjusting member.

2. The battery device according to claim 1, wherein said external force applying device is a loop-like tightening member which surrounds said battery stack and said temperature adjusting member, and contacts an outside of said second in-between part to press said second in-between part against the other one of said side surfaces of said battery stack.

3. The battery device according to claim 1 comprising: two sets of said battery stack; two sets of said heat transfer member; two sets of said temperature adjusting member; and two sets of said second end member fixture, wherein,
said two sets of said battery stack are separated from each other in a predetermined horizontal direction orthogonal to said straight direction,
one of said two sets of said battery stack exchanges heat with one of said two sets of said temperature adjusting member through one of said two sets of said heat transfer member,
the other one of said two sets of said battery stacks exchanges heat with the other one of said two sets of said temperature adjusting member through the other one of said two sets of said heat transfer member,
said two sets of said second end member fixture face each other in said predetermined horizontal direction so as to form a gap therebetween,
one of said two sets of said second end member fixture faces the other side surface of one of said two sets of said battery stack,
the other one of said two sets of said second end member fixture faces the other side surface of the other one of said two sets of said battery stack, and
said external force applying device includes wedge members which are positioned in said gap and contact two of said second in-between parts to press said two of said second in-between parts in such a manner that said two of said second in-between parts are further apart from each other in said horizontal direction.

4. The battery device according to claim 1, comprising:
two sets of said heat exchange part, formed on both side surfaces of said temperature adjusting member;
two sets of said heat transfer member; and
two sets of said battery stack,
wherein,
one of said two sets of said heat transfer member and one of said two sets of said battery stack are positioned at one of both sides of said temperature adjusting member,
the other one of said two sets of said heat transfer member and the other one of said two sets of said battery stack are positioned at the other one of said both sides of said temperature adjusting member, and
said external force applying device includes:
pressed parts, each of which is provided at one of said two sets of said first end member fixture so as to be connected to said first in-between part of one of said two sets of said first end member fixture and has a through hole, each of said two sets of said first end member fixture facing said one side surface of each of said two sets of said battery stack;
bolts, each of which goes through said through hole of said pressed parts; and
nuts, into which said bolts are screwed, to let said pressed parts come closer to each other.

* * * * *